United States Patent
Chakradhar

(10) Patent No.: US 10,306,183 B2
(45) Date of Patent: May 28, 2019

(54) SOCIAL MEDIA PLATFORM

(71) Applicant: BLRT PTY LTD, Newtown, New South Wales (AU)

(72) Inventor: Anurag Chakradhar, Newtown (AU)

(73) Assignee: BLRT PTY LTD., Sydney (AU)

(*) Notice: Subject to any disclaimer, the term of this patent is extended or adjusted under 35 U.S.C. 154(b) by 75 days.

(21) Appl. No.: 15/036,286

(22) PCT Filed: Nov. 12, 2014

(86) PCT No.: PCT/AU2014/050347
§ 371 (c)(1),
(2) Date: May 12, 2016

(87) PCT Pub. No.: WO2015/070286
PCT Pub. Date: May 21, 2015

(65) Prior Publication Data
US 2016/0269686 A1    Sep. 15, 2016

(30) Foreign Application Priority Data

Nov. 12, 2013 (AU) ................. 2013904364
May 21, 2014 (AU) ................. 2014901882

(51) Int. Cl.
*G06F 15/16* (2006.01)
*H04N 7/15* (2006.01)
(Continued)

(52) U.S. Cl.
CPC ............ *H04N 7/155* (2013.01); *G06F 3/017* (2013.01); *G06Q 10/10* (2013.01); *G06Q 50/01* (2013.01);
(Continued)

(58) Field of Classification Search
CPC ....... H04N 7/155; H04L 51/10; H04M 3/567; G06Q 10/10; G06Q 50/01; G06F 3/017
(Continued)

(56) References Cited

U.S. PATENT DOCUMENTS 6,105,055 A    8/2000   Pizano et al.
7,945,622 B1   5/2011   Pegg
(Continued)

FOREIGN PATENT DOCUMENTS

CN    103019536 A    4/2013

OTHER PUBLICATIONS

International Search Report for PCT/AU2014/050347, dated Nov. 28, 2014, 4 pages.
(Continued)

*Primary Examiner* — Kristie D Shingles
(74) *Attorney, Agent, or Firm* — Patterson Thuente Pedersen, P.A.

(57) ABSTRACT

An improved social media or messaging platform can be provided, retaining in large measure both the immediacy and engagement of video conferencing, while not sacrificing benefits more characteristic of email and similar messaging platforms, such as asynchronous scheduling, bandwidth efficiency, and various administrative record-keeping benefits. Audio data and associated gesture data (for example, panning and zooming) is recorded by users in associating with image data, and shared with other users in a conversational thread, permitting a video-like experience without associated bandwidth overhead.

11 Claims, 23 Drawing Sheets

(51) Int. Cl.
*H04L 12/58* (2006.01)
*G06F 3/01* (2006.01)
*H04M 3/56* (2006.01)
*G06Q 10/10* (2012.01)
*G06Q 50/00* (2012.01)
*H04W 4/21* (2018.01)

(52) U.S. Cl.
CPC ............ *H04L 51/10* (2013.01); *H04M 3/567* (2013.01); *H04W 4/21* (2018.02)

(58) Field of Classification Search
USPC .......................................................... 709/206
See application file for complete search history.

(56) References Cited

U.S. PATENT DOCUMENTS

| | | | |
|---|---|---|---|
| 8,010,901 | B1 | 8/2011 | Rogers |
| 8,347,088 | B2* | 1/2013 | Moore ................... G06Q 50/00 713/166 |
| 2006/0026502 | A1 | 2/2006 | Dutta |
| 2006/0173985 | A1* | 8/2006 | Moore ................ G06F 17/3089 709/223 |
| 2007/0101190 | A1 | 5/2007 | Chen et al. |
| 2007/0160972 | A1 | 7/2007 | Clark |
| 2009/0110368 | A1 | 4/2009 | Nelson et al. |
| 2010/0306249 | A1* | 12/2010 | Hill ................... G06F 17/30867 707/769 |
| 2011/0066940 | A1 | 3/2011 | Asghari Kamrani et al. |
| 2012/0159527 | A1 | 6/2012 | Perez et al. |
| 2012/0204120 | A1 | 8/2012 | Lefar et al. |
| 2012/0221960 | A1 | 8/2012 | Robinson et al. |
| 2013/0104251 | A1* | 4/2013 | Moore ................... G06F 21/602 726/30 |
| 2013/0106888 | A1 | 5/2013 | Penner |
| 2013/0262579 | A1 | 5/2013 | Penner et al. |
| 2014/0032673 | A1* | 1/2014 | Mallet ................... G06Q 50/01 709/204 |
| 2015/0222682 | A1* | 8/2015 | Lewis ............. H04N 21/44016 715/719 |

OTHER PUBLICATIONS

Written Opinion of the International Searching Authority for PCT/AU2014/050347, dated Nov. 28, 2014, 4 pages.
European Search Report from EP 14 86 2032, dated May 17, 2017, 12 pages.
Written Opinion from SG 11201603794U, dated Feb. 27, 2017, 4 pgs.
Chinese Office Action for Chinese Application No. 2014800620727, dated Dec. 24, 2018, 12 pages.

* cited by examiner

SOCIAL MEDIA PLATFORM

RELATED APPLICATIONS

The present application is a National Phase entry PCT Application No. PCT/AU2014/050347, filed Nov. 12, 2014, which claims the benefit of AU Patent Application No. 2013904364, filed Nov. 12, 2013 and which claims the benefit of AU Patent Application No. 2014901882, filed May 21, 2014, each of which is incorporated herein by reference in its entirety.

FIELD OF THE INVENTION

The present invention relates to social media and messaging services, and more broadly to systems and methods for creating and sharing semantic content messages over electronic networks.

BACKGROUND TO THE INVENTION

Typically, videoconferencing, email or instant messaging are used as communications media for business collaboration.

Videoconferencing can be a 'good enough' substitute for face-to-face meetings, but is bandwidth intensive, and relies upon the scheduling availability of all parties. Telephone conversations are also widely used, but lack the visual cues of videoconferencing. Video-conferencing and meetings, despite these limitations, are often favoured as they offer immediacy, and engagement.

Emails and instant messages are also popular as they allow for a deferred receipt and response, and for this reason can be characterised as 'asynchronous' in nature. A full text-based record of all communications is also available for later reference, and is typically stored, indexed in various ways and searchable when needed.

Emails and instant messages are attractive on the one hand as they avoid the scheduling problems of synchronous communications media, and also retain a convenient record of communications. A particular limitation of such forms of communication is that they typically lack the immediacy and engagement of video-conferencing and similar forms of exchange, as referred to above.

Moreover, it can often be quite difficult to compose emails and instant messages to a desired level of clarity. Even the most articulate can struggle to present certain ideas, content or messages in email and instant messaging media. A notorious limitation of these forms of communication is the inability, or certainly difficulty, of conveying 'tone'—with attendant potential for miscommunication, especially if the subject matter is in any way sensitive.

The limitations of email and similar messaging platforms are in this sense manifold—falling on one hand on those composing messages to carefully craft messages that adequately convey an intended meaning, and falling on the other hand on the audience seeking to discern meaning given the limitations of the medium.

An object of the present invention is to provide a form of electronic communication which at least attempts to address these and other limitations of existing forms of communication, and in particular provide an asynchronous communications medium that resolves or at least mitigates these and other difficulties experienced in communicating by existing channels.

SUMMARY OF THE INVENTION

The inventive concept arises from a recognition that existing internet media are not entirely satisfactory in certain respects for the purpose of conveying semantic content asynchronously in a bandwidth-efficient manner.

An improved social media or messaging platform can to this end be provided that retains in large measure both the immediacy and engagement of video conferencing, while not sacrificing benefits more characteristic of email and similar messaging platforms, such as asynchronous scheduling, bandwidth efficiency, and various administrative record-keeping benefits.

The present invention broadly concerns a structured file format, and systems for recording, storing, and recreating such file formats as a communications medium over an electronic network of computing devices. The 'Blrt' file format combines compressed audio, animated gesture data, and a variety of digital media formats into a lightweight package.

Media files are separately stored but share a relationship with the audio/gestures, which facilitates the progressive transmission of the package data and media mostly at the time of creation, leading to a seamless and fast experience for the user. The separation of media from audio/gestures also duplicates data in a single 'conversation', where replies use the same media files so they do not need to be downloaded or uploaded more than once.

A network over which the messages are shared is referred to herein as an internet for convenience, as typically understood, but can be any suitable computer network, including public networks as well as closed or private networks. Such networks may include, as an example, firewalled corporate networks, or virtual private networks, regardless of whether or not they use Internet Protocols as variously implemented. The present invention is in other words agnostic to the particular form of networking hardware or protocols used in any specific network.

A dedicated application, or app, running on a client device is preferably used to author, distribute and view messages, though an interface can be provided via a general purpose web browser, or applications on diverse hardware devices and operating system platforms.

While messages can be directed by a user to an individual recipient, or multiple recipients, messages can also be 'broadcast' to a wider (that is, public) audience, or indeed a select approved audience. A system of permissions and controls can be implemented as required to regulate who is able to view and respond to messages. Moreover, a selection of messages can be curated as a stream for general consumption or by subscription.

The present invention in one aspect provides a computer-implemented method of hosting a messaging service on a server for use by users via client devices in communication with the server. The client devices execute an application for originating and sharing amongst users messages comprising image data, audio data, and gesture data, the server comprising hardware components adapted for performing steps of:

receiving audio data and gesture data relating to a message from an originating client device at the server;

storing the audio data and gesture data at the server in association with the image data to which the audio data and gesture data relates; and distributing the stored audio data and gesture data to a recipient client device from the server;

wherein the received audio data and gesture data are recorded at the originating client device in association with the image data, and distributed to the recipient client device for reproduction by the recipient client device in association with the image data.

Preferably, the method further comprises receiving image data from an originating client device at the server, and distributing the image data to a recipient client device.

The image data is received as or before the audio data and gesture data is recorded, which assists network traffic and network latency.

At the server, image data is preferably stored in association with audio data and gesture data to which the image data relates.

The gesture data advantageously comprises panning, zooming and rotating of the image data, as well as visual annotations layered on the image data.

The present invention provides in a further aspect a server for hosting a messaging service for use by users via client devices in communication with the server, the client devices executing an application for originating and sharing amongst users messages comprising image data, audio data, and gesture data, the server comprising hardware components adapted for performing steps according to first-mentioned aspect of the present invention.

The present invention in a yet further aspect provides a computer-implemented method of using a client device for interacting with a messaging service hosted on a server via an application executing on the client device for originating and sharing amongst users messages comprising image data, audio data, and gesture data, the application adapted for performing steps of:

uploading, to the server using the client device, image data;

recording, using the client device, audio data and gesture data which relate to image data; and uploading the audio data and the gesture data from the client device to the server for storage in association with the image data to which the audio data and gesture data relates.

The image data is preferably uploaded before or as the audio data and gesture data are recorded.

The present invention in a further aspect provides an application configured to execute on a client device according to the above-mentioned aspect of the present invention.

The present invention, as variously embodied, has many advantages, as will be apparent to those skilled in the art. Advantageously, from a user's perspective, the application is intended to provide a satisfactory substitute to meetings, calls and emails.

Specifically, the message format and application interface attempts to embrace the benefits of email, calls and meetings, while substantially avoiding their inherent limitations. Furthermore, the messaging service provides benefits often associated with video conferencing, but without the same bandwidth overhead, and without the necessity of scheduling difficulties. Preferred embodiments of the present invention are intended to streamline communication, and permit more effective collaboration.

Once recording begins, a user can start talking, thus narrating their message, and zoom into an image and scribble annotations where required. Such gestures are captured in sync with the accompanying audio, for in sync playback or reproduction by recipients. A user may send their message to many specified recipients. Sources images may be drawn from diverse sources, whether from native storage, or network storage.

As the messaging format comprises images, and are played back using the source images, (rather than video formats), the bandwidth required is factional compared to distribution of video files. Typical proposed usage suggests that the bandwidth footprint of the messaging service can be 50× lighter than a comparable service by existing video formats. Moreover, a cloud-centric server model permits media reuse at client device once distributed across applicable devices, further reducing bandwidth traffic.

This present invention seeks to combine the "respond in your own time", conversation record, and low bandwidth advantages of email and instant messages with the superior interpersonal communication qualities of meetings and videoconferences.

This is made possible through the combination of compressed audio, animated gesture data (rendered on the client side), and a variety of digital media attachments into a lightweight package (that is, the Blrt file format).

This package as played back on a client device is effectively a video-like rendering of a user's markup on attached media with a recorded audio commentary.

The Blrt package is conveyed as three key components: audio, gesture data, and attached media. The Blrt package is not transcoded at any point to a video file, which allows the format to remain at a significantly smaller filesize, which is the total filesize of the three key components.

Incidentally, this feature allows the transmission and markup of high resolution attached media at zero or minimal quality loss, while allowing reasonable bandwidth performance.

The Blrt package is not transmitted in full every time an exchange is made. Instead, the attached media files (which typically comprises the bulk of the filesize) are downloaded only once in a conversation.

Replies ('Blrt Replies') are made using the same media attachments and so in most cases, only audio and gesture data needs to be uploaded for these. The exception to this is if a user adds new images/pages to the conversation, in which case the system will only deliver the new media elements to users' devices, maintaining a high level of efficiency in server/device data interchange.

Also, the full package is progressively uploaded when a conversation is first created; the media attachments are uploaded as the user records their audio and gestures, then the audio and gesture data is recorded as the user selects the recipient(s). Generally speaking, this results in a seamless uploading experience with almost no perceived wait time for the user.

Various example applications can be envisaged. First, conventional one-to-one messaging may be used, as well as one-to-many messaging in a manner similar to conventional email messaging and a system of ('To' and 'cc' recipients). This aspect is primarily described herein, and is preferably conducted via a dedicated native app, or a mobile or web app, though accessing to messaging platform can be via a variety of outfits.

The messaging service can also however be provided in other aspects. As an example, public accounts can be provided to permit a public broadcast feed of messages, with accompanying tags—such as via a browsable domain and URL (for example, blrt.com/username/) in a manner similar to Twitter, Instagram or other social media services. Users can of course be individuals (whether citizens or celebrities), or indeed companies or brands. Moreover, users can be roles or offices (for example, Telstra Helpdesk, Australian Prime Minister, etc).

Furthermore, curated 'channels' can also be provided, based around content genres, events, or other themes (for example, blrt.tv/comedy/, blrt.tv/election2016, etc). Public messages can also be browsed by channel, or tags, hits, relevance, upvotes or other forms of filtering.

Messages can also be distributed or disseminated as embedded content in a variety of ways to suit prevailing requirements or tastes.

As described above, the present invention concerns the use of source images (also referred to herein as image data or a media file), rather than video. The advantages that accrue to embodiments of the present invention are contingent upon use of image data rather than video data per se, primarily in relation to bandwidth efficiency that can be realised by using image data to achieve a video-like experience. Image data is accordingly used herein according to its understood meaning, that is, as data relating to a single static frame, rather than multiple frames (however encoded) that characterise video data.

As is also understood, image data may be defined as raster data or vector data. Examples of typical raster image data formats are—by reference to their commonly used file extensions—JPG, GIF, PNG, TIFF, etc. An example of a vector file format commonly used is SVG, though various proprietary formats used in more specialised applications may also be drawn upon. Some file formats embrace a combination of raster image data and vector image data—such as Adobe Portable Document Format (PDF), in which text may for example be presented in vector form, alongside raster images.

As will also be appreciated, image data may be extracted from video data as a frame thereof, or some derived composite of the frames constituting video data.

DESCRIPTION OF PREFERRED EMBODIMENTS

Use Case Diagrams

Figure 1:
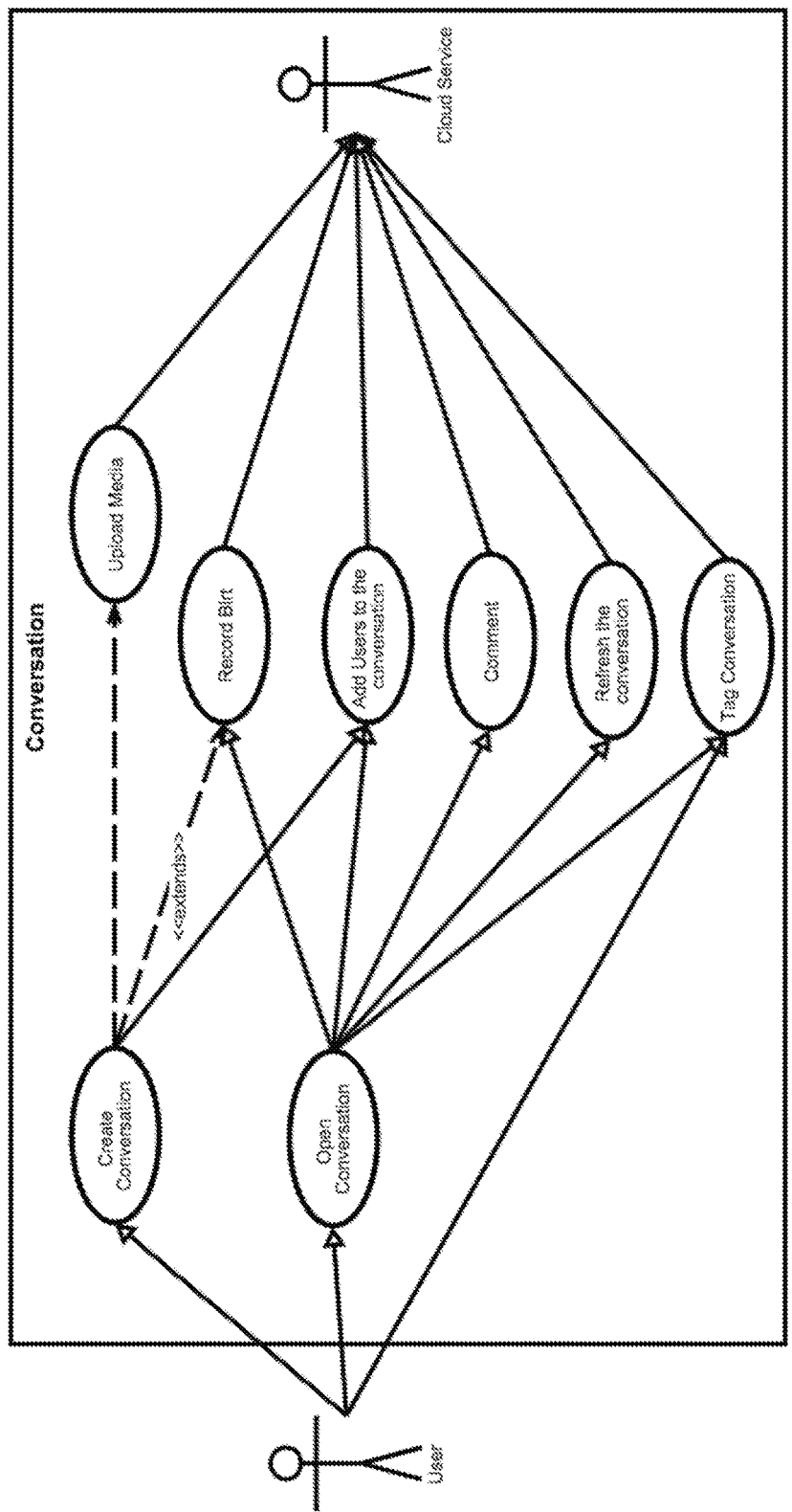
FIG. 1 is a use case diagram which relates to a conversation hosted on the platform, according to an embodiment of the invention.
Figure 2:
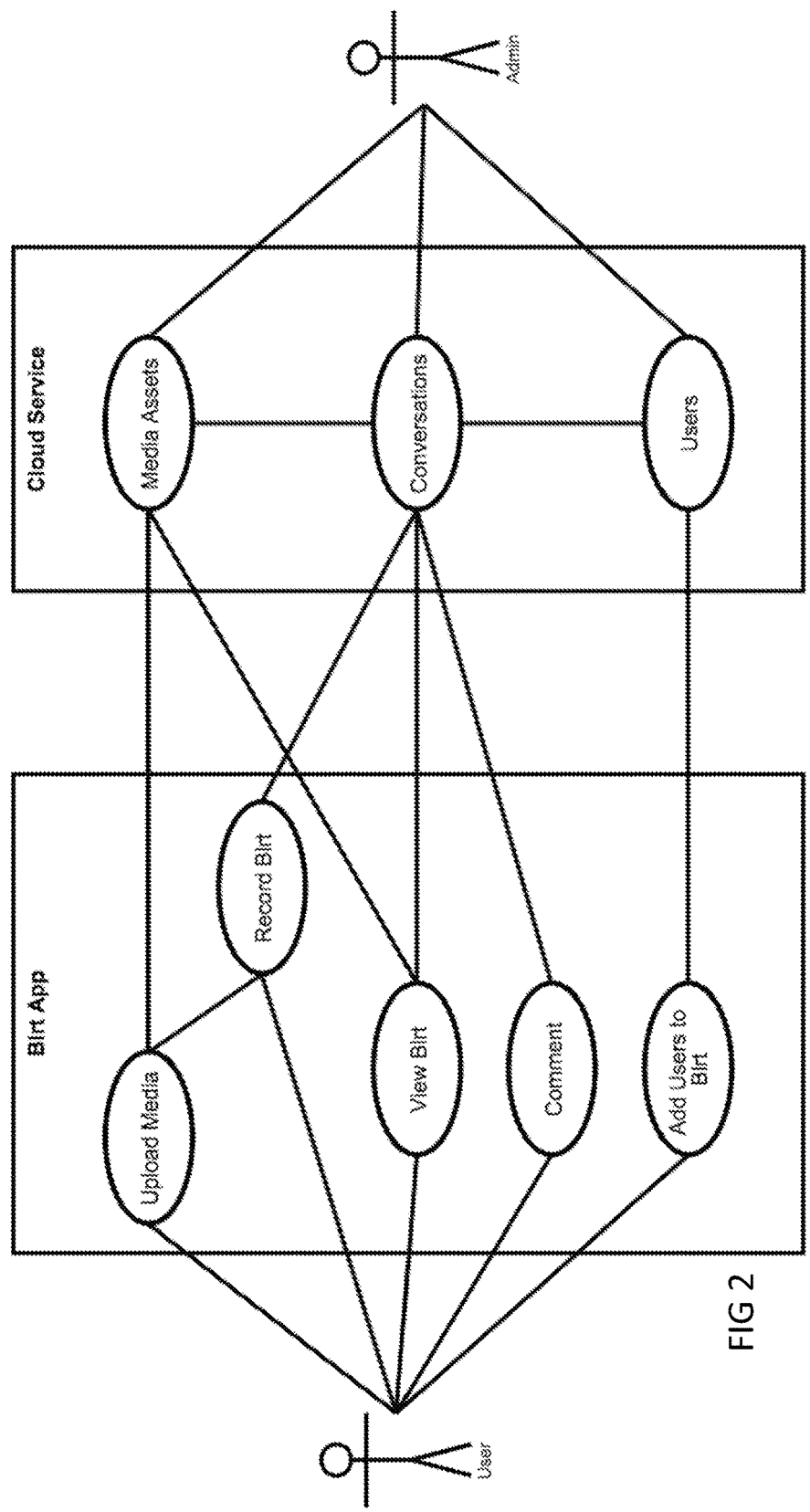
FIG. 2 is a further use case diagram, which relates to the cloud service and client application.

FIGS. 1 and 2 are use case diagrams for how a user interacts in a conversation, and how users interact with the cloud.

Referring to FIG. 1, a user can create a conversation, open a conversation, or tag a conversation. Creating a conversation involves uploading media, recording a Blrt and adding users to the conversation. Opening a conversation involves recording a Blrt, Adding users to a conversation, commenting upon a conversation, refreshing the conversation or tagging the conversation. These actions involve interaction with the cloud service, as depicted.

Referring to FIG. 2, a user interacts with the Blrt app by uploading media, viewing a Blrt, commenting upon a Blrt, or adding users to a Blrt. Recording a Blrt involves using uploaded media. The Blrt app interacts with the cloud service, which hosts Media Assets, Conversations and Users, and is administered by an Administrator.

At the cloud service, Media Assets receive uploaded media, and distribute media to the Blrt app when Blrts are to be viewed. Conversations receive Blrts recorded at the Blrt app, and distribute Blrts to the Blrt app to permit users to view Blrts and comments. At the cloud service, a record of Users is maintained, as updated at the Blrt app by users.

State Machine

Figure 3:
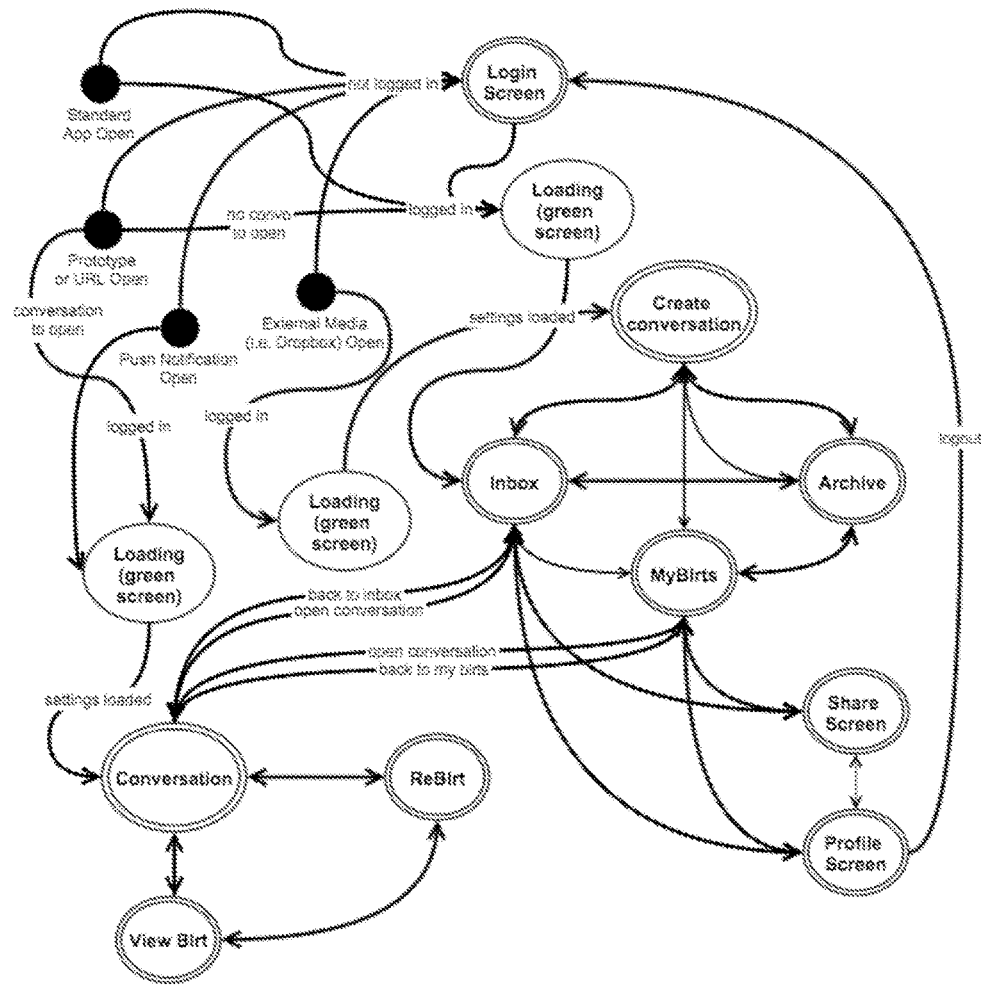
FIG. 3 is a state machine diagram which depicts state of the client application.

FIG. 3 is a state machine diagram that depicts states in using the Blrt app. The solid circles depict stating points—which may be when the Blrt app is opened, as standard, when a prototype or URL is opened, when a push notification from the Blrt app is opened, or when external media is opened (such as may be stored on a hosting service, for example Dropbox).

As depicted, double thickness two-directional arrows indicate standard navigation paths (which can be easily reversed by going back).

The app has no explicit ending state because the user can technically exit the app at or in between any state.

Double circle states are ones which hold and wait for user input before transitioning to other states (however there may exist exceptional cases where it will transition on its own without the user providing input, such as if a 'push notification' is received to update settings and the app then decides to enter maintenance mode).

In each case, however the app is opened, if a user is not logged in, the state proceeds to a Login Screen. Otherwise (if logged in), a user proceeds to a respective applicable Loading screen.

If the user opened the application as standard, or if there was no conversation to open of a prototype or URL was opened, then an Inbox is presented.

From the Inbox state, a user may go to and from the Conversation state, or to and from the MyBlrts state, or go to and from the Create Conversation state, or go to and from the Archive state. Furthermore, when in the Inbox state, the app may go to and from the Profile Screen state, or go to and from the Share Screen state. The app may swap between the Profile Screen state and Share Screen state when in either.

When in the Conversation state, the user can go to and from the MyBlrts state, go to and from the Blrt Reply state, or go to and from the View Blrt State. The app can swap between the Blrt Reply state and View Blrt state as required.

When in the Blrt Reply state, the app may go to and from the Profile Screen state, go to and from the Share screen state, go to and from the Archive state or go to and from the Create conversation state.

Blrt Package Structure

Figure 4:
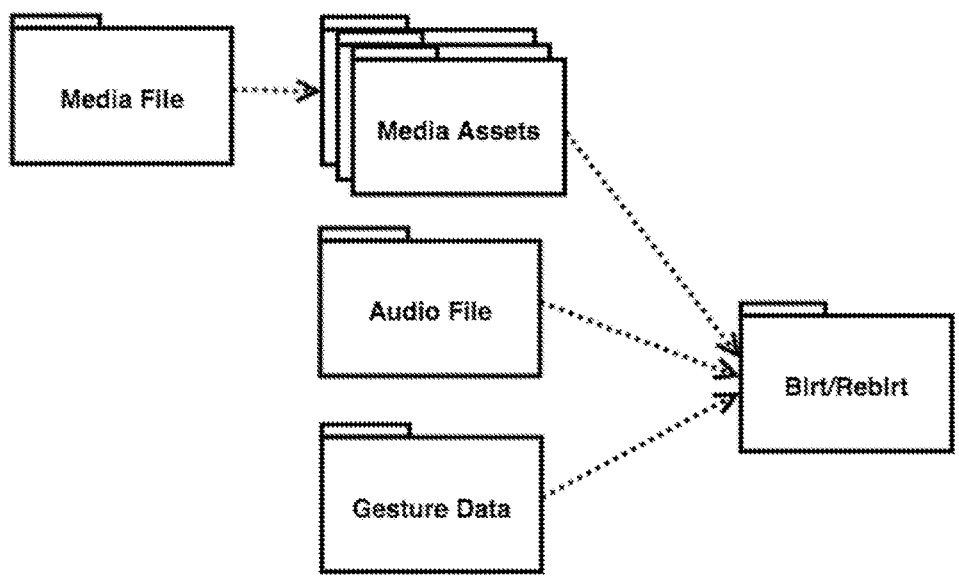
FIG. 4 is a package structure diagram for the Blrt package.

FIG. 4 depicts a package structure of a Blrt. A Blrt Reply is structured in the same manner as a Blrt, and comprises a combination of Media Assets, an Audio File, Gesture Data. The Media Assets comprise constituent media files.

Figure 5:
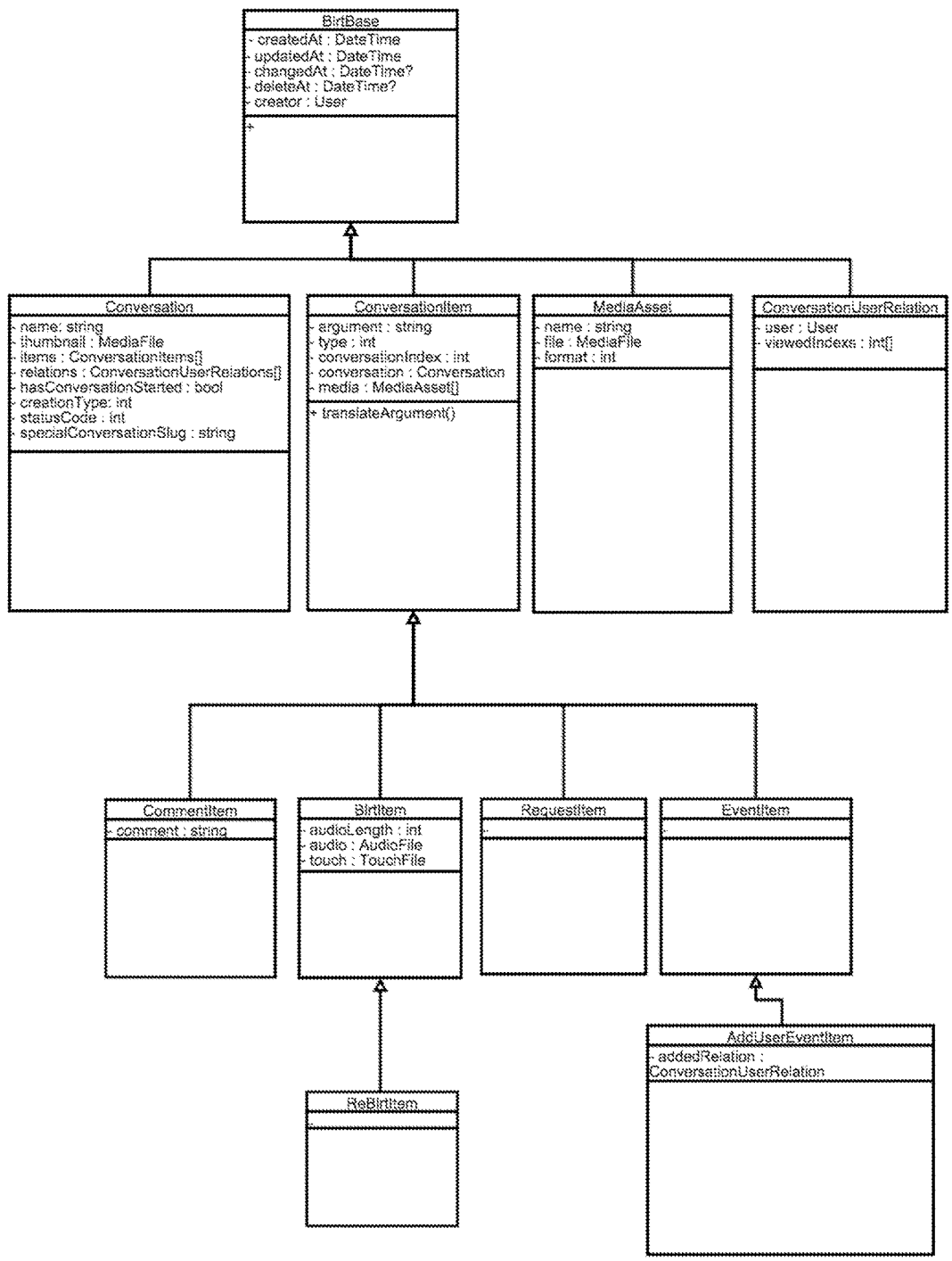
FIG. 5 is a class diagram for package structure of FIG. 4.

FIG. 5 depicts the package structure of FIG. 4 in further detail. A BlrtBase class has the following properties and associated types:
    createdAt: DateTime
    updatedAt: Datetime
    changedAt: DateType
    deleteAt: DateTime
    Subclasses of BlrtBase are:
    Conversation
    ConversationItem
    MediaAsset
    ConversationUserRelation
    Conversation comprises the following properties and associated types:
    name: string
    thumbnail: MediaFile
    items[ ]: ConversationItems[ ]
    hasConversationStarted: bool
    creationType: int
    statusCode: int
    specialConversationSlug: string
    ConversationItem comprises the following properties and associated types:
    argument: string
    type: int
    conversation Index: int
    conversation: Conversation
    media: MediaAsset[ ]
    Moreover, ConversationItem comprises the following method:
    translateArgument( )
    MediaAsset comprises the following properties and associated types:
    name: string
    file: MediaFile
    format: int
    ConversationUserRelation comprises the following properties and associated types:
    user: User
    viewedIndexs: int[ ]
    ConversationItem also comprises the following subclasses:
    CommentItem
    BlrtItem
    RequestItem
    EventItem
    CommentItem comprises a property 'comment' with property 'string', while BlrtItem comprises the following properties and associated types:
    audioLength: int
    audio: AudioFile
    touch: TouchFile
    EventItem has a subclass AddUserEventItem which comprises a property 'addedRelation' having type ConversationUserRelation.

Figure 6:
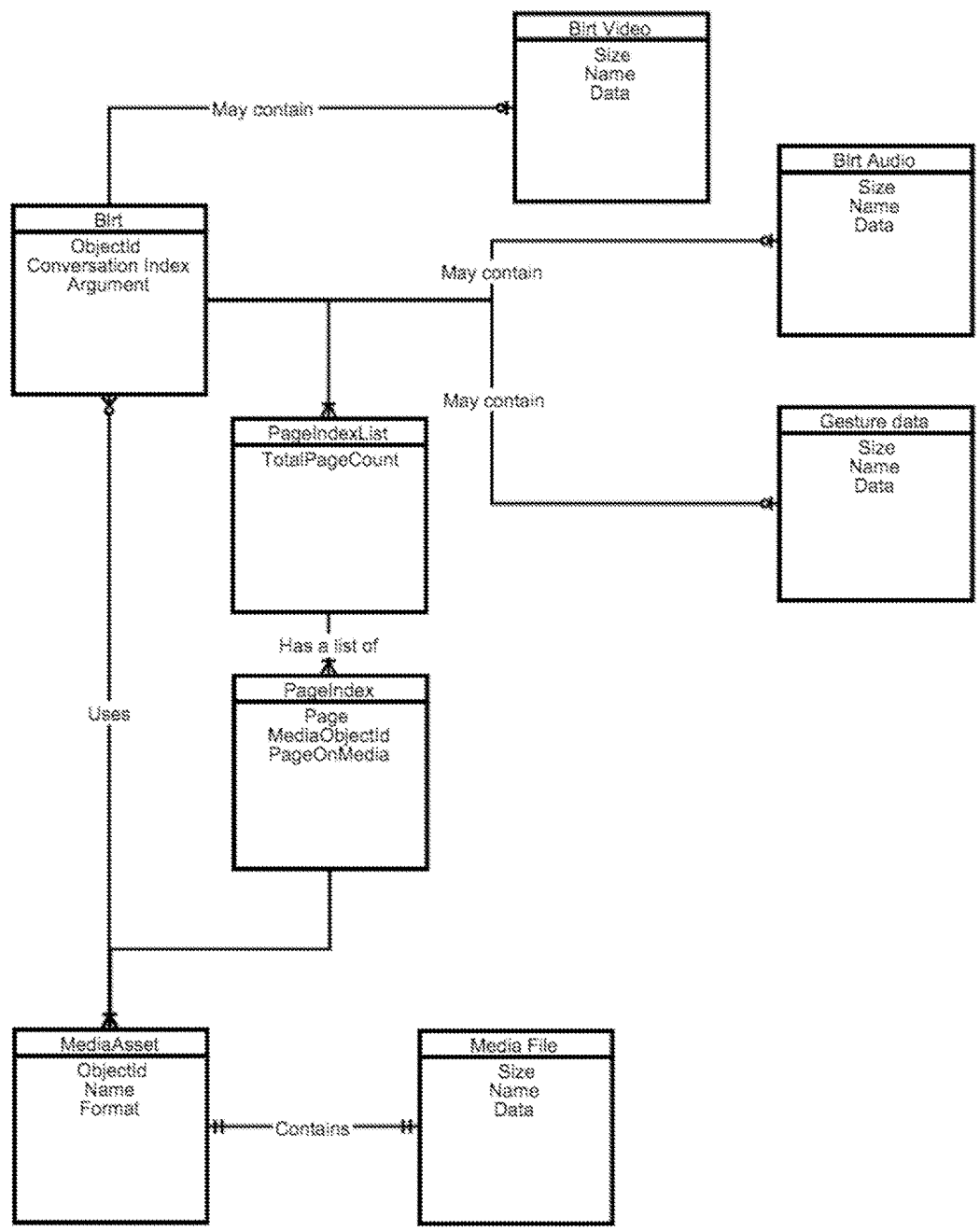
FIG. 6 is a concept diagram for the Blrt file formats.

FIG. 6 is a concept diagram of the Blrt file formats, and depicts the following components and their properties:
    Blrt
        ObjectID
        ConversationIndex
        Argument
    MediaAsset
        ObjectId
        Name
        Format
    MediaFile
        Size
        Name
        Data
    BlrtAudio
        Size
        Name
        Data
    PageIndexList
        TotalPageCount
    PageIndex
        Page
        MediaObjectId
        PageOnMedia
    Assocations between components are as follows. A Blrt uses MediaAssets, which of which contains a MediaFile. A Blrt may contain a BlrtAudio and GestureData. A Blrt also has a PageIndexList, which comprises a PageIndex indexed MediaAssets.

Figure 7:
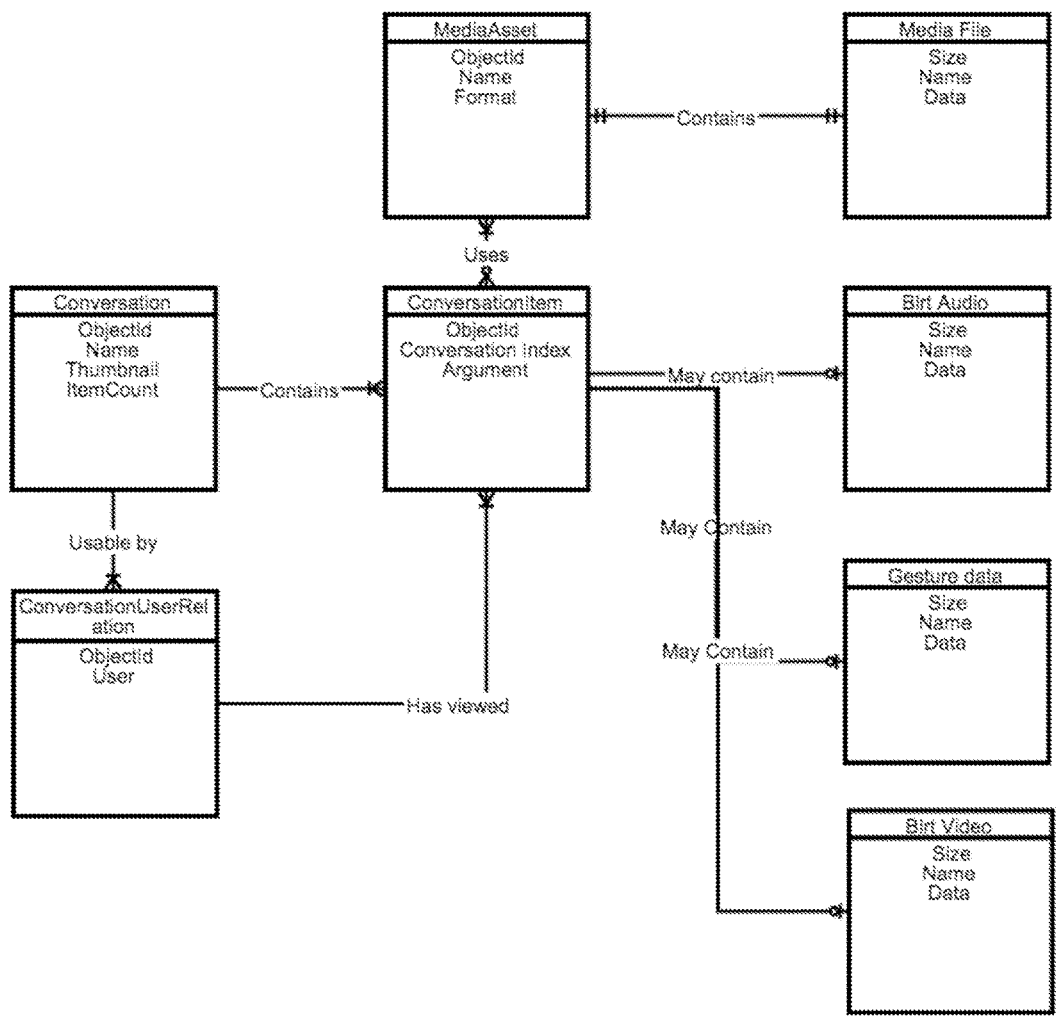
FIG. 7 is a concept diagram for the Conversation Item class of the Blrt package.

FIG. 7 is a concept diagram for a ConversationItem. The same components as FIG. 6 are used, with the addition of:
    ConversationItem
        ObjectId
        ConversationIdex
        Argument
    Conversation
        ObjectId
        Name
        Thumbnail
        ItemCount
    ConversationUserRelation
        ObjectId
        User
    Assocations between components are as follows. A ConversationItem may contain BlrtAudio, and GestureData. A ConversationItem uses MediaAssets, each of which contains a MediaFile. A ConversationItem contains a Conversation, which is usable by a ConversationUserRelation.

Figure 8:
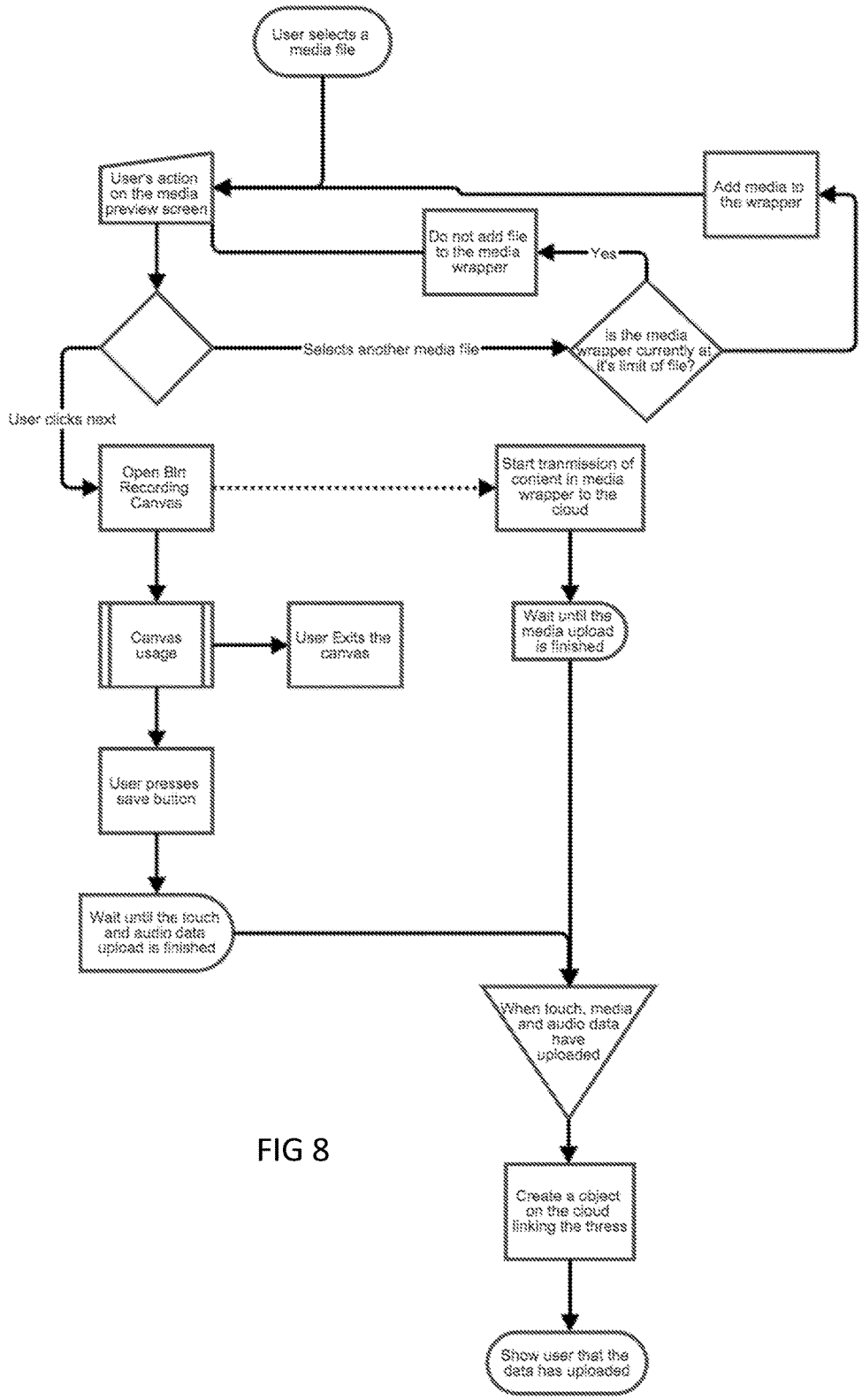
FIG. 8 is a flow chart depicting how a user uploads a Blrt.

FIG. 8 is a flowchart of steps (in simplified overview) involved in using the Blrt app by a user. First, a user selects a media file, and performs an action of the selected media file in a preview screen. A determination is made as to whether or not further media files are to be added. A user may select another media file, in which case a determination is made by the app as to whether the media wrapper is at the limit of its size. If so, the media is not added, otherwise the media is added.

Once media files are selected, and no further media files are to be added, the user clicks 'next', and opens a Blrt recording canvas in the app.

Actual canvas usage can be separately specified, as required and indicated.

Once the recording canvas is opened, transmission of content of the media wrapper is initiated, until upload is completed. Later, once touch, media and audio data have uploaded, an object is created on the cloud linking the three: a Blrt message. An indication is provided to the user that the data has uploaded.

As described above, the recording canvas is used however required, and once complete, the user presses the save button. Typically, at the conclusion of using the recording canvas, media upload is complete, or it at least advanced to some degree. In any case, the touch and audio data must be completed once recorded, and used to construct the Blrt message format in associated with the media files.

Figure 9:
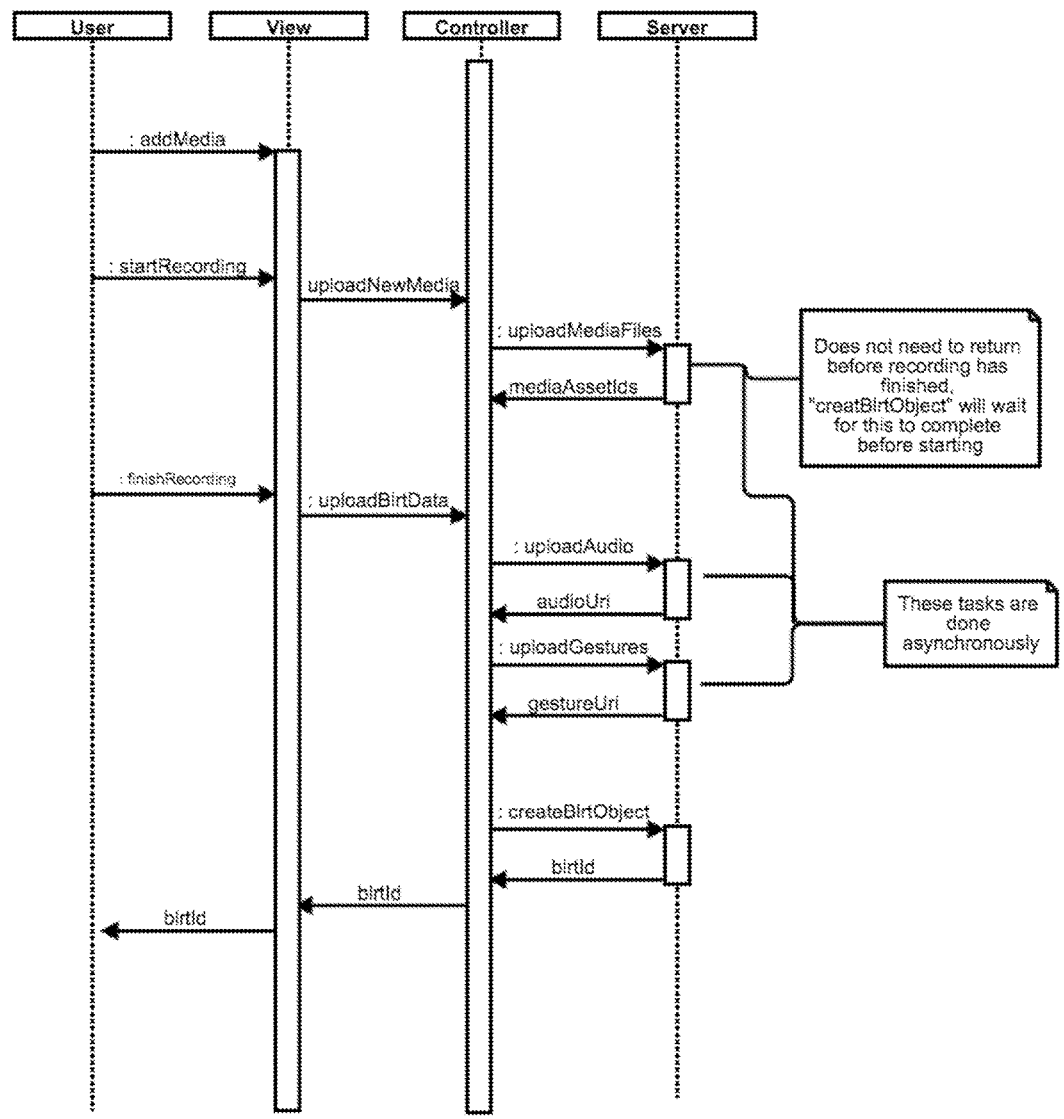
FIG. 9 is a sequence diagram of events between a user and the server when a Blrt is uploaded.
Figure 10:
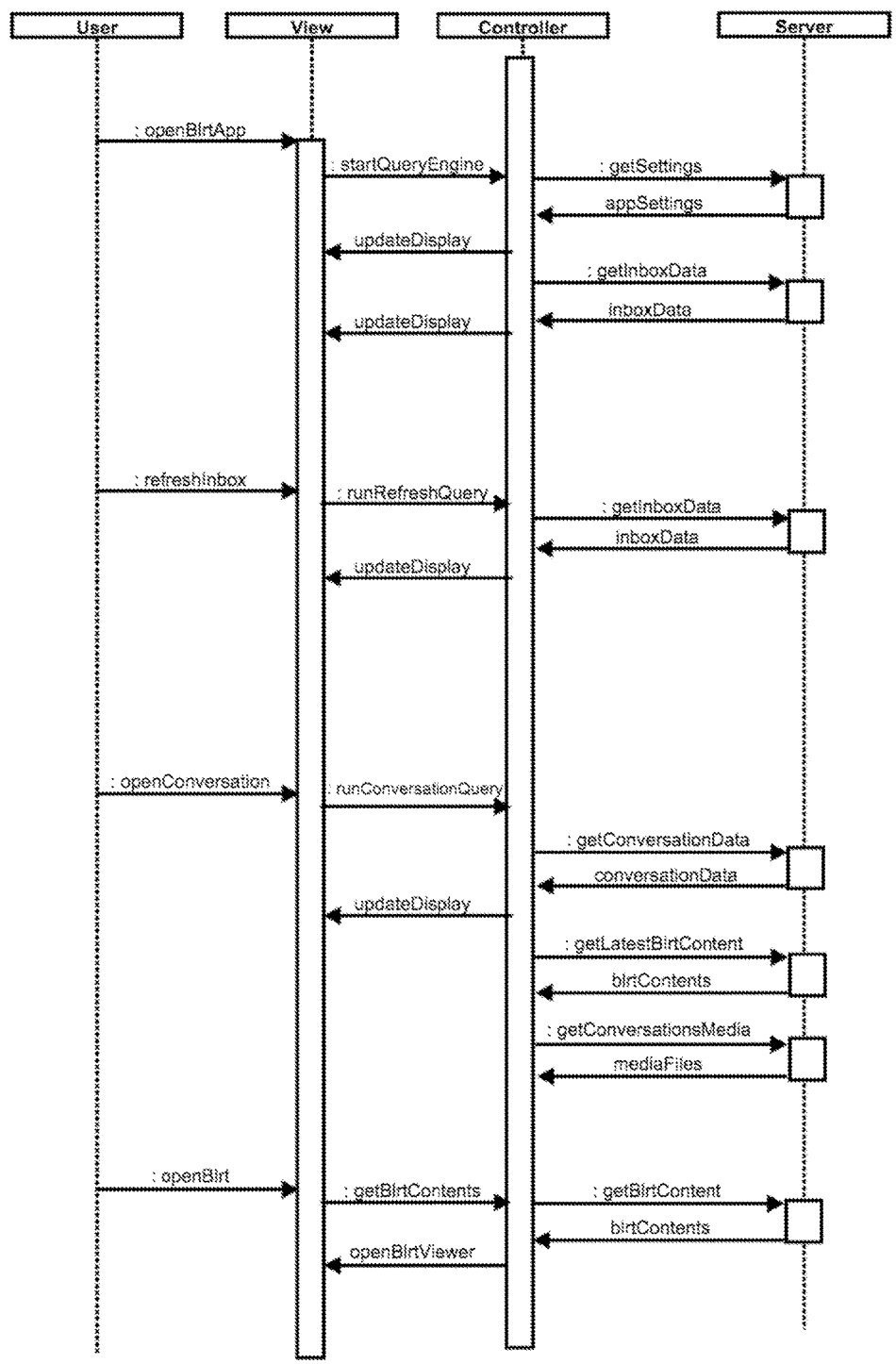
FIG. 10 is a sequence diagram of events between a user and the server when a Blrt is downloaded.

FIGS. 9 and 10 are sequence diagrams depicting interaction between a User, View, Controller and Server that serve to highlight operation of the static components described above.

Referring to FIG. 9, a User engages a View layer to addMedia, and subsequently to startRecording. The View layer in turn engages a Controller layer to uploadNewMedia. The uploaded media passes from the Controller layer to the Server via uploadMediaFiles. The Server returns to the Controller layer with mediaAssetIds for uploaded media files. Subsequently, the User indicates to the View layer finishRecording, and the View layer in turn seeks to uploadBlrtData to the Controller layer.

A series of communications between the Controller layer and Server ensues. The Controller layer issues uploadAudio, and the Server returns with audioUrl. Similarly, the Controller layer issues uploadGestures, and the Server returns with gestureUrl.

The Controller layer then requests the Server to creatBlrtObject, and the Server obliges and returns to the Controller layer with a blrtId, which is passed back to the View layer and then the User.

Notably, the Server does not need to return to the Controller layer before recording is finished. The process creatBlrtObject will wait for this to complete before starting. Also, uploading of media files, audio recording and gesture data is performed asynchronously, which is favourable to performance of the service.

Referring to FIG. 10, the steps in generally using the Blrt app are described.

First, the User requests the View layer to openBlrtApp, and the View Layer requests the Controller layer to startQueryEngine. The Controller layer then requests the Server to getSettings, and the Server returns with the appSettings. The Controller layer updates the View layer (updateDisplay). The Controller also requests getInboxData of the Server, which duly returns with the User's InboxData to the Controller layer. The View layer is again updated (updateDisplay, again).

When a User requests the View layer to refreshInbox, the View layer requests the Controller layer to runRefreshQuery. The same process follows, with a getInboxData request made of the Server, and the Server, and the Server returning with InboxData, and then the Controller layer returning to the View layer with updateDisplay.

When a User requests the View layer to openConversation, the View layer requests the Controller layer to runConversationQuery. Similarly, the Controller layer requests the Server to getConversationData, and the Server duly returns to the Controller layer with conversationData. The Controller layer seeks to updateDisplay for the View layer.

Subsequently, the Controller also requests of the Server getLatestBlrtContent and get ConversationMedia, and the Server returns (respectively) with blrtContents and mediaFiles.

When a User requests the View layer to openBlrt, the View layer requests the Controller layer to getBlrtContents. The Controller layer passes this request to the Server, which returns with blrtContents. The Controller later returns to the View layer with openBlrtViewer for display to the User.

Selecting Media

To create a Blrt, a user selects the New Blrt button on the Inbox or My Blrts screen. They must first select at least one 'page' of media. Media can be:
Images stored on the device
Images taken from the device camera
Images or PDFs downloaded directly from a user's Dropbox account
A predefined image template
Images derived from websites Media Preview Once one page of media is selected, it is displayed as a preview. The preview can be zoomed and inspected. This is the Media Preview screen.

The user can then add additional 'pages' of media. Different media types can be used together as separate pages in a single Blrt. The user may add as many pages as their user restriction allows (defined by server cloud code based on subscription level). By default, a user can use up to 10 standard pages.

The user can tap the "trash" icon to delete a page they have added to the Blrt at this stage. This cannot be done once a Blrt has been saved to the cloud or the device.

Imported PDFs will be imported to use the actual pages of the PDF as pages of the Blrt. There is a separate user restriction defined for maximum PDF pages as opposed to maximum Blrt pages.

Blrt Title

When a user selects "Next" to confirm their choice(s) for media added as pages to the Blrt, they are prompted to give the Blrt a title. This is mandatory.

The Blrt title will be the main descriptor of the Blrt's content, much like the subject line of an email.

Canvas—Recording

The user now sees the "canvas" screen. The canvas screen has two main states—recording and playback. The canvas screen in the recording state will display the first page of the Blrt.

The media attachments (Blrt pages) begin to be uploaded to the cloud in the background at this point.

There are initially the following interactive elements on the UI:
Drawing toolbar (tools described further below)
"Back" button—this will return the user to the Media Preview screen
Record button—this will begin recording and enable the drawing toolbar
Timeline—this cannot be interacted with before recording as there is nothing yet to play back
Page selector—this will display the total number of pages in the Blrt and can be flipped through before and after recording, as well as during.

After tapping the Record button, the recording of the Blrt is initiated. Now:
The Record button becomes a Stop button
The playhead starts moving and the time counts upwards
Audio from the device's microphone is recorded
The drawing tools are enabled As the recording continues, the user can use the drawing tools available. Every action taken by the user is recorded locally into a lightweight "touch"
data file during the recording. This includes drawn lines and shapes, pointer movement, canvas transformations, page turns and undo/redos.

The drawing tools available are as follows:
Pencil tool—this will draw a line on the canvas in freehand
Shape tool, which can be one of the following:
Circle tool—draws a circle on the canvas, with width and height defined by dragging
Rectangle tool—draws a rectangle on the canvas, with width and height defined by dragging
Line tool—draws a straight line on the canvas, with start and end points defined by dragging
Point tool—this will display a "laser pointer" like circle on the canvas during the user's finger press. When the user lifts their finger the pointer will disappear Transform tool—allows the user to freely zoom and reposition the canvas (this is still possible with other tools selected by dragging or pinching the canvas with two fingers)

Colour selector—flies out to display a colour selector. The selected colour will be the colour of anything drawn with the pencil, shape or pointer tool Stroke weight selector—flies out to display the stroke weight selector with three options. The selected weight will be the stroke weight of anything drawn with the pencil or shape tool.

Undo/redo—undo the previous drawing change, or redo it. This does not include page turns, pointing or transformations.

When 10 seconds remain out of the time allowed for a Blrt (a user restriction dependent on level of subscription) a large "10" flashes on screen to indicate that time is running out. When 5 seconds remain, a large "5" will appear and will countdown until the remaining time reaches zero. At this point, recording will end.

A web URL can be selected instead of media in the media selection step. The app will take a scrolling screenshot of the website at that URL and import that as image media. This functionality can extend to scraping a HTML/CSS/img package of the webpage (much like the MHT files used by Internet Explorer), which will be identical or close in size to the website download.

Canvas—Playback (after Recording)

When recording is stopped, the UI is now in the playback (after recording) state. The UI now includes the following interactive elements:

"Clear" button (replaces the "Back" button)—this will erase the recording just made and changes the canvas screen to the pre-recording state (after the user confirms this action in an additional popup).

Record button (replaces the Stop button)—this will resume recording from the current stopped position. This will not be visible if the recording has already reached the end of the maximum allowed time.

Play button—this will play back the recording from the beginning. NOTE: currently, this will mean you cannot resume recording again.

Timeline with the playhead at the stopped position. This is greyed out and not interactive at this stage.

Save button—will initiate the saving/sending process (detailed below)

When the Play button is tapped, the recorded Blrt will play back in real time, with the audio and gestures exactly in sync as they were recorded. The Play button changes to a Pause button during playback, which will pause the playback of the audio and gestures and display a freeze frame of the recording at the point of pausing. In the playback state, the playhead can also be dragged to "scrub" through the recorded Blrt. Pressing Play will resume playback from the playhead's position.

Saving

The Save button appears on the UI after recording has stopped, and will also appear when the canvas is in the playback state after recording. Upon pressing the Save button:

A Blrt object is created on the cloud

A relationship between the Blrt object and the media (already uploaded during the recording phase) is created The audio and gesture data begins uploading to the cloud.

Upon tapping the Save button, the user immediately sees the Send Screen. This is a popup on top of the canvas screen.

Send Screen

The send screen contains the following UI elements:

"To" field—this is where the user can add initial recipients to the Blrt. They can do this in one of the following ways:

Type an email address manually in the To field, followed by a comma character or return to confirm.

Begin typing an email address or name into the To field. A popup will appear as the user types to autosearch matching contacts from the various sources outlined below.

Tap the "+" button, which will bring up a Contacts popup. This popup can be filtered by the following:

All contacts in alphabetical order

Recent—contacts saved locally on the device based on who has recently been in contact with the user via Blrt. This includes all users or email addresses that have been in the same Blrt conversation as the user at any point.

Device contacts (named iPad or iPhone depending on device)—all contacts saved locally in the built-in Contacts app on the iOS device. The Blrt app must be given permission to access these contacts, which the user is prompted for the first time the contacts popup is opened.

Facebook—lists Facebook "friends" of the user if the user has linked their Facebook account to their Blrt account Permissions must be granted when the user first logs in with Facebook to allow Blrt access to their friends list.

LinkedIn and other social media platforms—the app allows the user to link their accounts for other online services in a similar way to Facebook.

Blrt Title field—this will be prefilled with the Blrt Title specified in the step between the Media Preview and Canvas screens. This is an opportunity for the user to edit the Blrt Title before adding users to the Blrt conversation.

Add a Note—this is an optional field. The user can enter a 'note' in this field, which will be added as an Event in the Blrt conversation, and will be added to the notification email send out to recipients of the Blrt.

Upload progress bar—this shows the user the progress of the upload of the media, audio and gesture components of the Blrt. When this progress bar shows 100%, then the three key components of the Blrt have been successfully uploaded to the cloud.

Cancel

Send

If the media attachment(s) had not finished uploading during the recording phase, their upload is completed as part of this step before the audio and gesture data is uploaded to the cloud.

Both the "Cancel" and "Send" buttons on the send screen are disabled while data uploads. If the upload times out, or fails (due to any reason, usually due to loss of internet connection), the user is given the opportunity to:

Retry—the app will attempt to upload the remaining data that has not yet been upload.

Save—all files are cached locally to the device. Cached Blrts will be documented in another section.

Cancel—all components of the Blrt—media, audio and gestures—will be cleared and the user is taken back to the Inbox screen.

Once the data has uploaded 100%, the Blrt object is successfully created and is complete on the cloud. The "Cancel" and "Send" buttons on the send screen can now be used.

If the user taps Cancel at this stage, they are returned to the conversation screen for the newly created Blrt conversation (with themselves as the only user in the conversation). Because the upload completed, the Blrt object has been successfully created on the cloud.

If the user taps Send, the app verifies the recipient(s) in the To field:
  Manually entered email addresses must fit the regular expression of a valid email address. If one or more does not, the user is prompted to fix the error.
  The amount of recipients must not exceed the maximum amount allowed by the user restriction on the user's account type. If this is exceeded, the user is prompted to remove recipients until the amount of recipients falls within the allowable range.

If the email addresses (or Facebook IDs) of the specified recipient(s) successfully validate, the server will check if Blrt accounts already exist for the specified email addresses.

If an email address or Facebook ID matches a registered Blrt account in the database, a relationship is created between this Blrt conversation and the recipient's Blrt account, giving the recipient permission to access this Blrt conversation and Blrt object. An email notification and a push notification are generated to the recipient once the relationship has successfully been made.

If an email address or Facebook ID does not successfully match a registered Blrt account in the database, a user object is still created. A relationship between this Blrt conversation and the recipient's user object is created. This can be found later at the point of registration, so that the recipient will be able to view this Blrt conversation even if they sign up after receiving it. If a user object has already been created for this email address or Facebook ID (such as when a given email address or Facebook ID has been added to multiple Blrt conversations before they sign up for a Blrt account), then a relationship is created between this Blrt conversation and the existing user object.

In this case of an unregistered recipient, an email notification using a specific template is generated.

Once the appropriate relationships between the Blrt conversation and all specified recipients have been made, confirmation is shown to the user. The user can then select Done, to be taken to the conversation screen for the newly created Blrt.

Blrt Conversations
Conversation Screen

The conversation screen displays the following elements related to the specific Blrt conversation being viewed, in chronological order of creation date/time:

| Element | Description | Display format |
| --- | --- | --- |
| Blrt | The intial Blrt object that initiated the Blrt conversation. Every Blrt conversation will begin with a Blrt. | Speechbubble element with the running time of the Blrt, a thumbnail of the first page of the media attachment of the Blrt, and a creation timestamp. Displayed on the right if created by the current user, or on the left if created by another user. Tapping on this element will take the user to the canvas - playback screen to view the Blrt. |
| Blrt Reply | Any additional Blrt made by any user in the conversation after the initial Blrt was created. | Speechbubble element with the running time of the Blrt Reply, a thumbnail of the first page of the media attachment of the Blrt Reply, and a creation timestamp. Displayed on the right if created by the current user, or on the left if created by another user. Tapping on this element will take the user to the canvas - playback screen to view the Blrt Reply. |
| Comments | Text-based comments made by the any user in the conversation. | Speechbubble element with the creation timestamp and the text content of the comment. Displayed on the right if created by the current user, or on the left if created by another user. |
| Events | Used to display significant time-based events in a Blrt conversation, such as when new users are added, or "notes" when adding new users. | Text element runs the full width of the screen. |

Other UI elements on the conversation screen are:
  "Back" button—returns the user to the Inbox or My Blrts screen, depending on where the user came from
  Blrt Title—displays the title of the Blrt conversation being viewed
  Refresh—forces the Blrt conversation to grab any new content from the server relating to this Blrt conversation and refresh the conversation screen
  "Add people to Blrt" button. This will bring up the send screen as a popup. It will function in the same way as the send screen that pops up on the canvas screen after saving a Blrt, but the Blrt title cannot be changed. The user may add a note, which will be included in the email notifications and appear as a separate event in the conversation. When new users are added to the Blrt conversation, an event will be displayed in the conversation.
  "Manage tags" button. This brings up a popup identical to the "Manage Tags" popup on the Inbox screens, detailed in the Archive and Tags section.
  "Filter by people" button. This will bring up the "Filter by people" popup, which displays a list of the users in the conversation's names and email addresses. These are separated into registered users who have viewed the conversation, registered users who have not yet viewed the conversation, and other users that do not have a Blrt account registered. Tapping on a user in this popup will filter all elements in the conversation screen to display only elements created by that user. Multiple users can be selected in the filter. The filter can be cleared with the "Clear" button in the popup.
  "Blrt Reply" button—takes the users to the canvas recording screen to create a Blrt Reply.
  Comment box—when tapped, flies out the keyboard for the user to enter a comment.
Comments When the comment box at the bottom of the conversation screen is tapped, the device's native on-screen keyboard will fly upwards, allowing the user to enter a text comment.

After the comment text has been entered, the user can add it to the conversation by tapping the Send button. This will immediately save the comment locally on the device and display it as a new element at the bottom of the conversation. It will also immediately begin uploading to the cloud.

As the comment uploads to the cloud, a "loading" icon is displayed alongside the element. This will continue to upload in the background if the user leaves the conversation screen. Once the comment has been successfully uploaded to the cloud, it will be visible to other users in the conversation. It will deliver a push notification to all users in the conversation, and an aggregated email notification generated a maximum of once per hour.

If the comment fails to upload for any reason, a "red cloud" icon will be displayed alongside the comment element to indicate the comment is stored locally but not on the cloud. This icon can be tapped to retry uploading.

Blrt Replies

By tapping the Blrt Reply button at the top right of the conversation screen, a user can create a Blrt using the same media attachments as the original Blrt in the conversation, called a Blrt Reply. When the Blrt Reply button is tapped, the user is taken to the canvas recording screen with the media attachments for this Blrt conversation pre-loaded. These media attachments do not need to be uploaded to the cloud again at any point during the creation of a Blrt Reply.

The canvas recording screen for a Blrt Reply is identical to the canvas recording screen when creating a New Blrt and works the same way, except for the Save button. The save process is different for a Blrt Reply as opposed to a Blrt. Upon tapping the Save button:

The user is immediately returned to the conversation screen

The Blrt Reply element is immediately displayed as a new item in the conversation, with a loading icon alongside it The audio and gesture data begins uploading to the cloud The user is not restricted from performing any other action during any stage of the saving process.

When the audio and gesture data for the Blrt Reply has successfully uploading to the cloud, the loading icon alongside the Blrt Reply element disappears.

This indicates that the Blrt Reply is in the cloud and will be visible to other users in the conversation. A push notification and email notification is generated to all other users in the conversation when the Blrt Reply has successfully uploaded.

If the Blrt Reply fails to upload for any reason, a "red cloud" icon will be displayed alongside the Blrt Reply element to indicate the Blrt Reply is stored locally but not on the cloud. This icon can be tapped to retry uploading.

Blrt Inbox Screens

Inbox

The Blrt Inbox screen displays all Blrt conversations the current user has permission to access, ordered by when each conversation was last updated.

The "Inbox" screen (as opposed to "My Blrts" or "Archive") displays only conversations that contain at least one conversation item from a user other than the current user. The UI for this screen contains the following items:

Archive button—takes the user to the Archive screen.

Blrt logo and "Inbox" header

"Filter by tags" button—this will bring up the "Filter by tags" popup. The user can select from a list of all tags used by any conversation that appears on this screen. Selecting tag(s) will filter the inbox screen to show only conversations that contain the selected tag(s). Tapping the Clear button in this popup will deselect all tags. If the inbox is currently being filtered by tag(s), the "Filter by tags" icon will display as red.

"Filter by people" button—this will bring up the "Filter by people" popup. The user can select from list of all users that have been added to any conversation that appears on the screen. Selecting one or more users will filter the Inbox screen to show only conversations that the selected user(s) have been added to. Tapping the Clear button in this popup will deselect all users. If the inbox is currently being filtered by people, the "Filter by people" icon will display as red.

"New Blrt" button—this will initiate the Blrt creation process outlined in "Creating a Blrt".

Each Blrt conversation listed in the inbox screen has the following elements:

Page icon—displays the count of pages in the Blrt

Thumbnail—thumbnail sized image of the first page of the Blrt (without markup)

Blrt title—displays as red with a red circle to the left if there are unread items in the conversation Text displaying "New from <user>" if there is an unread item in the conversation, otherwise "Started by <user who created Blrt>".

Timestamp of the latest update of the conversation

Cloud icon, in one of the following states. Tapping on the icon reveals a popup explaining the meaning of the icon.

Grey cloud with dotted line—indicates there are one or more items in the conversation that are uploaded to the cloud, but have not been downloaded to this device Grey cloud with check mark—indicates every item in the conversation is uploaded to the cloud and has also been downloaded to this device Red cloud with exclamation mark—indicates there are one or more items in the conversation that have been created and saved locally (cached) but have not yet been uploaded to the cloud OR that no one other than the current user has been added to the conversation "Manage tags" icon—tapping reveals the "Manage tags" popup "People" icon—tapping reveals a popup with a comma separated list of the users in the conversation Item count—speechbubble icon displaying the total count of items in the conversation (not including events). A small red circle with the number of unread items is also displayed above this icon if there are any unread items.

Tapping on a Blrt conversation on the inbox screen, anywhere other than the cloud, "Manage tags" or "People icons, will take the user to the conversation screen for that Blrt.

If there are no Blrt conversations in the inbox screen (such as if all conversations have been archived), a graphic prompting the user to create a Blrt is displayed instead.

My Blrts

The My Blrts screen is accessible from the bottom tab bar of the app. My Blrts has identical functionality and appearance to the Inbox screen, with the only difference in the conversations it displays. The My Blrts screen displays only conversations created by the current user.

Tagging

Tagging functionality exists in order to add short text "tags" to Blrt conversations to use as a customisable filter in the inbox screens. Tags are added and removed via the "Manage tags" popup, which can be accessed via the "Manage tags" icon on a conversation in the conversation list in the inbox, or via the "Manage tags" icon in the header of the conversation screen. The "Manage tags" popup has identical UI and functionality regardless of which screen it is accessed on.

The "Manage tags" popup lists tags that are attached to the Blrt conversation. Tags are stored as an array on the Blrt object on the cloud.

A new tag can be added by tapping and then typing in the text box at the bottom of the "Manage tags" popup. The user can then tap the "Add tag" button to add the tag to the list. The tag will be uploaded to the tag array on the cloud immediately, which is part of the relationship between the conversation object and the user object. If there is a loss of internet connection, the change to the tag array will be uploaded to the cloud the next time the device regains an internet connection.

Tags can be removed from the Blrt conversation by tapping on the tag object to deselect it in the "Manage tags" popup. The user has a chance to re-select the tag before they close the "Manage tags" popup. When the "Manage tags" popup is closed, any deselected tags will be removed and will no longer appear in the list.

Any tag selected or created will only be visible or take effect for the current user. It will have no effect on how any other user views or interacts with a Blrt conversation.

There are two special tags in the "Manage tags" popup—"Archive" and "Flagged". These tags are deselected by default and will always appear at the top of the tags list in the "Manage tags" popup for every Blrt conversation.

Archive

Though a user cannot permanently delete a Blrt conversation, if a user wants to declutter their Inbox/My Blrts screen they can move conversations to the Archive screen. Blrts are archived by selecting the special "Archive" tag visible in the "Manage tags" popup.

When the "Archive" tag is contained in the tag array in the relationship between the user object and the conversation object, that Blrt conversation is not displayed in the Inbox/My Blrts screens. These Blrt conversations are visible only in the "Archive" screen, which is accessible via the "Archive" button on the Inbox/My Blrts screens.

The Archive screen is the same regardless of whether it was accessed from the Inbox or My Blrts screens. All conversations marked with the tag "Archive" will be shown.

A conversation can be moved back to the Inbox/My Blrts screen by opening the "Manage tags" popup for that conversation and deselecting the "Archive" tag. The tag change will take effect when the "Manage tags" popup is closed.

Flagging

A Blrt conversation can be "Flagged" is the "Flagged" tag is selected in the "Manage tags" popup.

When a Blrt conversation is Flagged, it will appear in another section above all non-flagged Blrts on the Inbox/My Blrts/Archive screens. This section has a red bar extending across the screen, which is not visible if there are no Flagged conversations on the screen being viewed. Flagged conversations also have a flag icon to the left of the Blrt title, and a lighter background.

User Profiles, Account Types and Subscriptions

Profile Screen

The Profile screen is accessible via the tab bar at the bottom of the app, and contains the user's profile, account details and settings.

The UI Elements on this screen are as follows, in order:
Feedback & Support link—opens a support hub popup where users can search the Blrt Knowledge Base and submit support requests or feedback to the Blrt Team.
User Profile section—displays all fields of a user's profile, and an Edit button which allows the user to edit any of the following:
Email—primary email address for account
Display Name—how the user's name is displayed to other users
First Name
Last Name
Gender
Organisation
Industry
Password
Facebook section
If the user has a Facebook account connected to their Blrt account, this section will display the Facebook user's name and a 'disconnect' button.
If the user does not have a Facebook account connected, this section will display a "Log in with Facebook" button
Blrt News—fetches a JSON file at a URL specified in the database to render news items, each with a title, thumbnail, description and optional link. This is refreshed every time the Profile Screen is opened.
Account section—detailed in the next section 'Account types'
Settings section
Notification settings—slides to a new screen where the user can toggle whether they want to receive email notifications for:
New Blrts
Blrt Requests
Blrt Replies
New comments (email digest only sent out a maximum of once per hour)
Device settings
Show help overlays again—toggling this will enable the "help overlays" to show one more time for the user
Version—displays the app version number
Log out—logs the user out of the app and returns them to the login screen.

Account Types

All Blrt user accounts have an Account Type, which determines the user's permissions and maximums for various features of the Blrt app. The features that are affected by Blrt Account Types are:
Max Blrt duration—the maximum length of time for a single Blrt or Blrt Reply by the user
Max users in conversation—the maximum number of users that can be added to a conversation (a given conversation will be restricted by the account maximum for the creator of the conversation)
Max media size—the maximum filesize in MB for a single 'page' of media (or a full PDF) that can be uploaded by the user.
Max image resolution—the maximum resolution in pixels that an uploaded image can be before it is resized by the app
Max images—the maximum number of 'pages' of image media for a created Blrt (this does not include PDFs)
Max PDF pages—the maximum number of pages that an uploaded PDF can contain Even if a user's account type does not have a certain permission, they can still view Blrts or conversations that were created by a user that does have the permission, or had the permission when the conversation was created. For example, if a user's account type lets them make Blrts only one minute long, they can still receive and view a Blrt sent by a user with an account type to allow for three minutes long.

The account types and restrictions are defined in the database, and so are not hardcoded into the app. Existing account types and restrictions can be edited by the Blrt Admins, and new user account types can be created by the Blrt Admins. There is a default account type that all new accounts will automatically use (at launch, "Blrt Free"). Accounts can be manually individually upgraded to other account types by Blrt Admins, or upgraded via a free trial or subscription (detailed in the next section).

Example Account Types and Feature Restrictions

|  | Blrt Free (default) | Blrt Premium |
|---|---|---|
| Max Blrt duration | 1:00 | 5:00 |
| Max users inconversation | 10 | 50 |
| Max media size | 5.00 MB | 10.00 MB |
| Max image resolution | 5000 × 5000 | 5000 × 5000 |
| Max images | 10 | 25 |
| Max PDF Pages | 50 | 100 |

Subscriptions and Free Trials

The default account type for all new users is the "Free" account, and does not expire. If a user finds the permissions in the free account type too restrictive, they are encouraged to upgrade their account to "Blrt Premium". The standard path for a user to upgrade their account is via the Profile-Screen.

Free Trials

The Account section on the Profile screen displays a user's current account type, subscription expiry date (if applicable), and feature restrictions. If a user is on the "Free" account type, there is a button to start a free trial of Blrt Premium. When the user selects the free trial option, no purchase or subscription is made. The user is immediately upgraded to another account type "Blrt Premium Trial", which has the same user restrictions as Blrt Premium. The database is updated to change the user object's account type, and the "expiry date" field is set to 30 days hence.

As the user approaches the expiry date of the free trial, they are given timed notifications (in app dialogs, push notifications and email notifications) reminding them to make a payment to subscribe in order to keep the additional permissions afforded by Blrt Premium.

If the user account has already used a free trial of Blrt Premium in the past, regardless of whether they have also made a paid subscription before, they will be unable to get a free trial again.

Premium Subscription

The user may make a payment at any time via the profile screen to commence their paid subscription to Blrt Premium. Tapping the 'Activate Subscription' or 'Get Premium' button (copy depending on whether they are currently on the free trial) will call an in-app purchase dialog. The user may then choose the length of their subscription from in app purchase objects defined by the Blrt Admins (at launch, there will only be the option to buy a year's subscription). Though it is referred to as a subscription, the in-app-purchase is implemented as a non-renewing once-off purchase made through the user's iTunes account (for iOS).

Once payment has been confirmed, the user's account type and expiry date on the user object on the database is changed accordingly. If the user still had time left on their free trial, those days are added to the length of the subscription.

Account Expiry

On the user object on the database, there is an expiry date field along with the user's current account type. This defines when the user's current account type will 'expire'. When a user's account type expires, they are immediately downgraded to the default account type (Blrt Free).

Account expiry date can trigger email and push notifications, and in-app dialogs at the time of expiry, or specified amounts of days before.

Premium Renewal

When a Premium subscription has less than 30 days remaining before the expiry date, the user is prompted at various intervals to renew the subscription. Since the in-app-purchase implementation is a non-renewing product, the user must accept the payment again. Once payment has been confirmed, the purchased subscription period is added to the expiry date field for the user.

Maintenance Mode

Blrt Admins, via cloud code, have the ability to enable "maintenance mode" for all or select users of the app, based on criteria. This can be useful for server maintenance, old incompatible versions of the app, or any unforeseen circumstances requiring user access to be temporarily (or permanently) disabled.

There are multiple modes of maintenance mode that can be enabled:

Partial Lockout

Partial lockout maintenance mode allows users to browse and view Blrts, Blrt Replies, conversations and comments that have already been downloaded, however they are unable to create content or do anything requiring the server or database to be updated or cloud code to be executed. An alert message is given to the user to indicate that they are temporarily unable to create content (Blrts, Blrt Replies, conversations and comments). Another alert is given to the user once the partial lockout is lifted.

Partial lockouts can be applied to specific users, groups of users, or all users.

Full Lockout (Maintenance)

Full lockout maintenance mode fully disables the app's functionality, and replaces it with one screen with a maintenance message defined in cloud code. The user is completely unable to use any of the app's functionality when this mode is enabled. When the mode is disabled, a push notification is sent to all disabled devices to ask it to refresh and restore the app's functionality.

Full lockout (maintenance) can be applied to specific users, groups of users, or all users.

Full Lockout (Invalid Version)

If the Blrt Admins determine that an old version of the app is incompatible with the current database, they may set a field on the database for the threshold of allowable app versions. If an app of any version below the threshold attempts to make a request to the server, full lockout maintenance mode is engaged with a message urging the user to update the app.

Full lockout (invalid version) is controlled by the allowable app version threshold and cannot be manually enabled for specific users or groups of users.

Blrt Cloud and Local Caching

Cached Blrt after Failed Upload

After recording a new Blrt and tapping "Save", the user sees the upload progress of media, audio and gesture data. If this fails at any point before full (100%) successful upload due to loss of connection or other reasons, the user may opt to save the Blrt locally on the device (a cached Blrt).

The media, audio and gesture data is saved locally to the device, and the user sees a standard Blrt conversation screen. The "red cloud" icon is displayed next to the original Blrt element to signify it has not yet been uploaded to the cloud. Without the initial Blrt object in the cloud, the entire conversation is effectively not in the cloud, so the user is prevented from adding other users to the conversation until the Blrt has been uploaded.

Facebook and Other Services Integration

Blrt utilises the Facebook API to facilitate the following connectivity:

Log in with Facebook

Users can utilise the "Log in with Facebook" button on the login screen of the app to create an account and login. On first login, the app will authenticate with Facebook and ask the user for the following permissions:

Basic Default Permissions (includes the user's name, gender, locale)
    Email address
    Friend list If a user does not grant these permissions, they cannot create a Blrt account and will not be able to log in via Facebook.

If granted, a Blrt account is created using the email address for the Facebook account as the username, with a relationship to the user's Facebook ID.

In future, logging in with that Facebook ID will automatically log in to the correct Blrt account.

A user may manually connect or disconnect a Facebook account from a given Blrt account at any time via the Profile screen. Disconnecting their Facebook account will mean they can no longer log in via Facebook, cannot utilise Facebook contacts in-app, and hereby must log in to Blrt using their email address and a password set upon disconnecting.

Facebook Contacts

As access to the user's Facebook Friend list is granted during the Facebook connection, Blrt is able to cross-reference these Facebook IDs with IDs that share relationship with other users in the Blrt user database. In other words, the Blrt app can display a list of a user's Facebook friends that also have a Blrt account.

This means Facebook can be used as a method of adding users to a conversation. On the Send Screen, when the user defines recipients, a list of the user's Facebook friends that also have a Blrt account will be listed, and Blrt will automatically add the corresponding Blrt user accounts to a conversation if Facebook users are selected. Those users will receive push notifications to their device and email notifications to their primary email address.

In future, the Blrt app may also be able to utilise the Facebook API to send app-generated messages to Facebook users who do not yet have a Blrt account. In this case, all of the user's Facebook friends will be displayed in the recipient selection list, not just friends with existing Blrt accounts.

Other Services

Many third party services and social networks have APIs similar to Facebook to authenticate login and grant apps permission to user data. Examples of possible integration for login and sending to contacts are LinkedIn, Google+, and Twitter. The contact list integration will be implemented similarly to Facebook, with the user able to connect multiple services and filter their contact list by each.

Blrt API

Both the Blrt app and Blrt Cloud will have its own API to enable connectivity to and from other software to create Blrts, update conversations, upload media, and more. Below are two possible examples that could utilise the Blrt API to extend functionality.

Custom Blrt Email Addresses

Every Blrt user will be granted an automatically generated, unique email address, such as name_33333@blrt.co. This email address will not be known or be able to be determined by anyone other than the user (unless the user deliberately shares it with others).

The user will be able to send emails to the unique email address to easily create Blrts.

Sending media files as an attachment with no subject or content in the email will allow the user to use those attachments to create a Blrt next time they start up the Blrt app
    Sending media files as an attachment with another user's email address in the subject line will automatically create a Blrt Request to the specified email address
    Adding content to the email itself will generate a note added to the Blrt Request Connectivity with Project Management Software Popular Project Management/Issue Tracking software such as JIRA allow third parties to publish plugins to extend their functionality and enable connectivity with other services. A plugin could be created for JIRA that will allow users to create a Blrt directly from media attached to a JIRA issue, or attach/link an existing Blrt to a JIRA issue for easy future reference.

Exemplary User Interface

FIGS. 11 to 29 comprise a series of screenshots that illustrate an exemplary user interface (and use) of the Blrt application, executing on an iPad, produced by Apple, Inc. The app may be provided for other hardware devices, and operating system platforms as required.

Image Example

Figure 11:
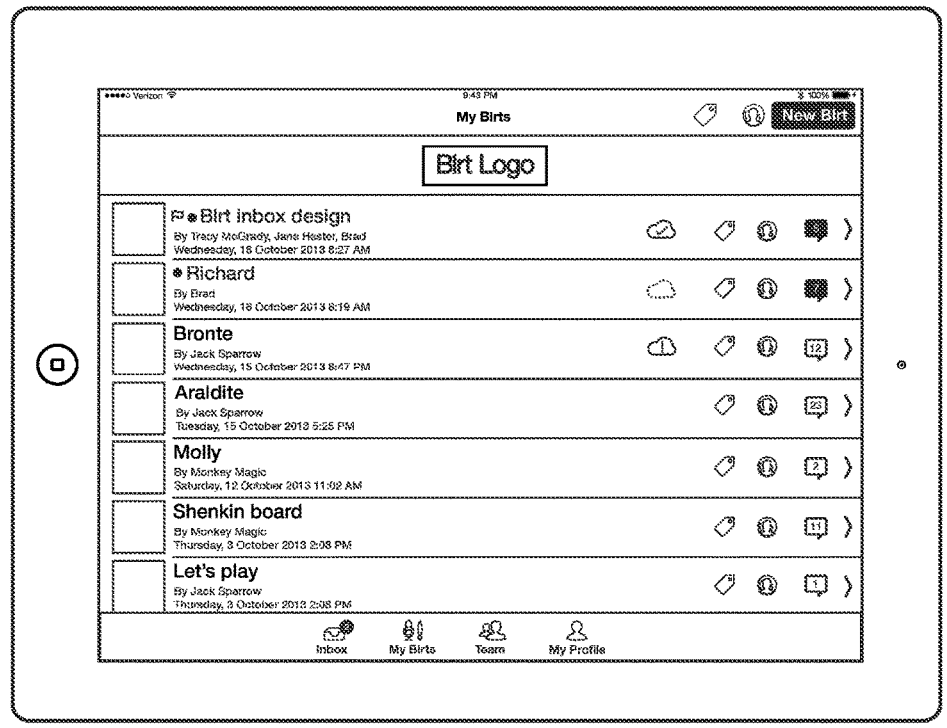
FIGS. 11 to 29 are exemplary user interfaces that illustrate aspects of user interaction with an application on a client device according to a preferred embodiment of the present invention.

FIG. 11 depicts a screenshot of the app, when the user is viewing 'MyBlrts'—essentially their Inbox. Subsequent FIGS. 12 to 18 depict some screenshots associated with constructing a new Blrt using an image.

Figure 12:
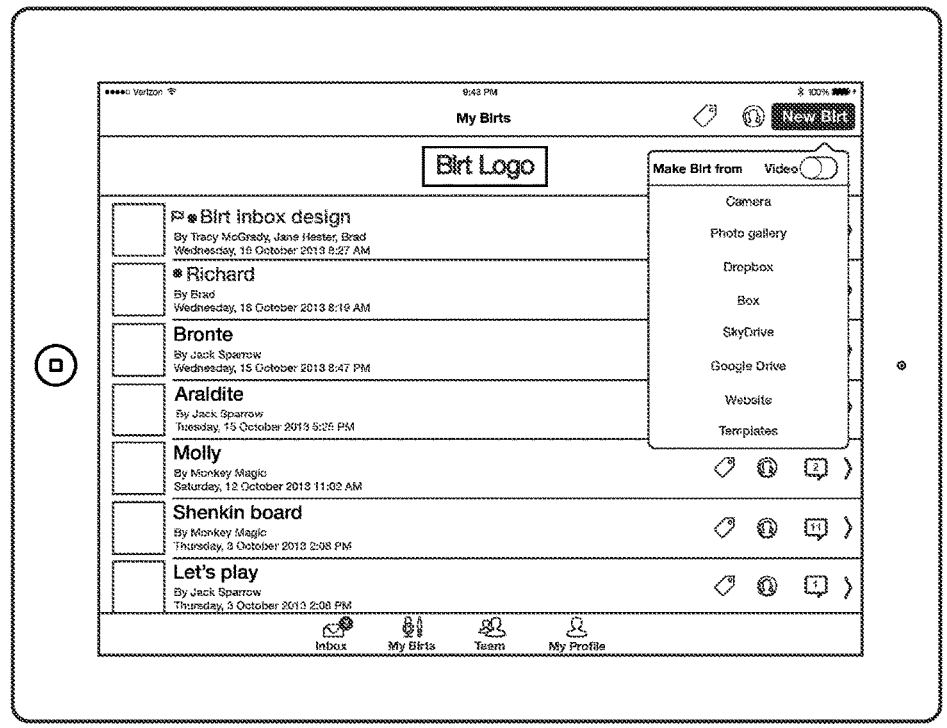
Figure 13:
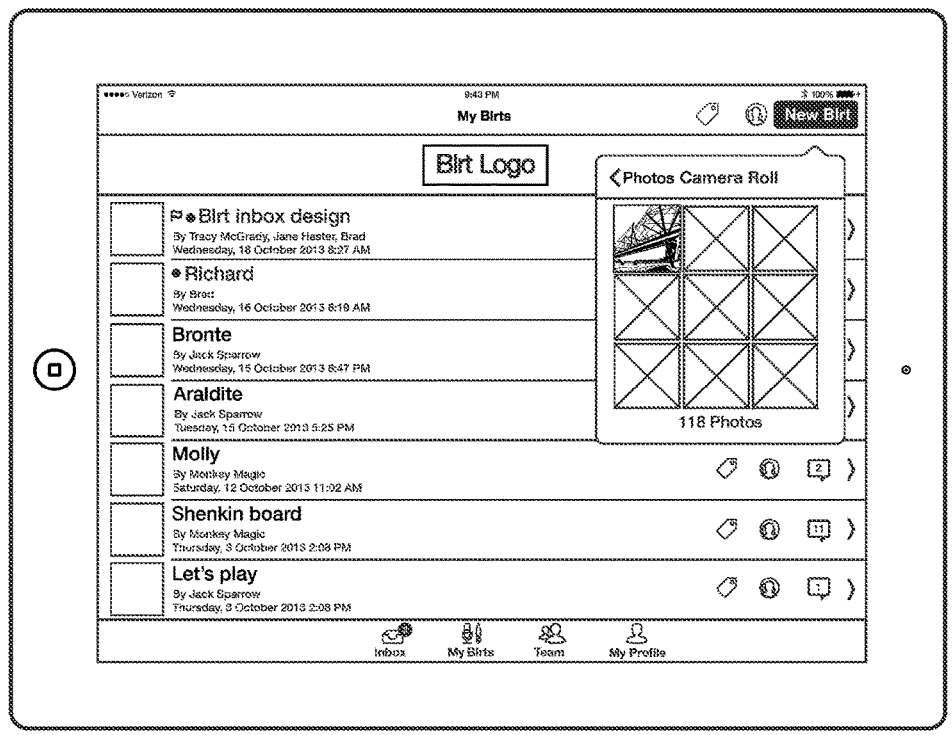

The user in FIG. 12 has clicked on a 'New Blrt' button to start the process of producing a new Blrt message. As depicted, the user is given the option of creating a new Blrt using various sources, including:

Camera
    Photo gallery
    Dropbox
    Box
    SkyDrive
    Google Drive
    Website
    Templates FIG. 13 depicts a screenshot, in which the user has selected 'Photo gallery' in FIG. 12, with the result that 'Camera Roll' has appeared in a window, for the user to make a selection from images locally stored on the iPad.

Figure 14:
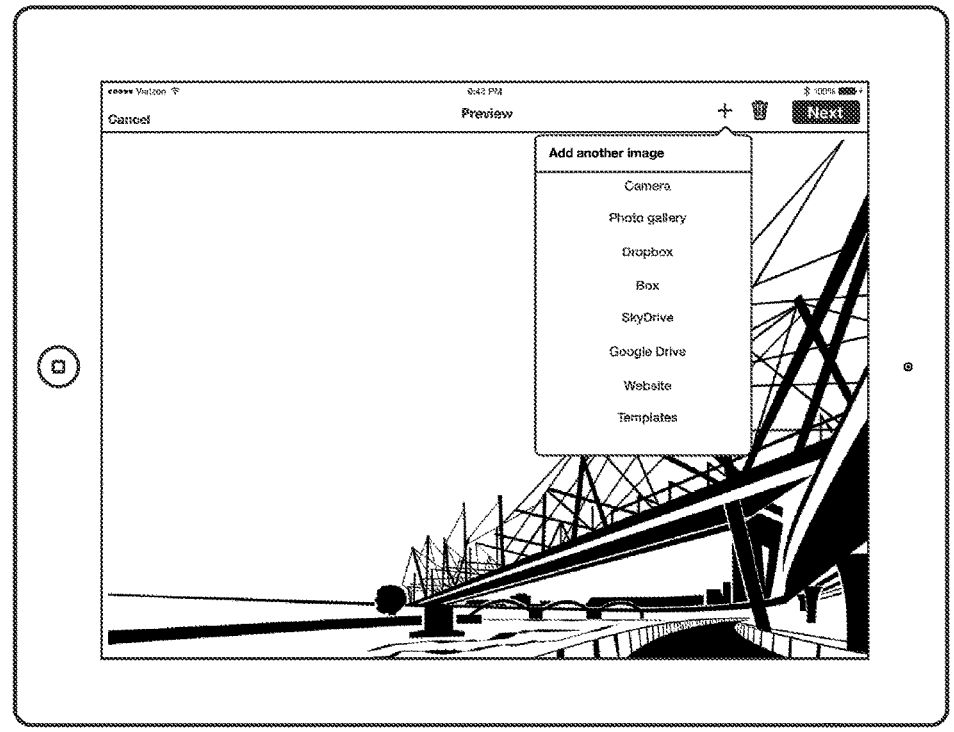

FIG. 14 depicts that an available image from the Camera Roll is selected, and shown at full screen in 'Preview'. The user is given the option to add a number of further images to construct the Blrt, in the same manner the first image was added.

Figure 15:
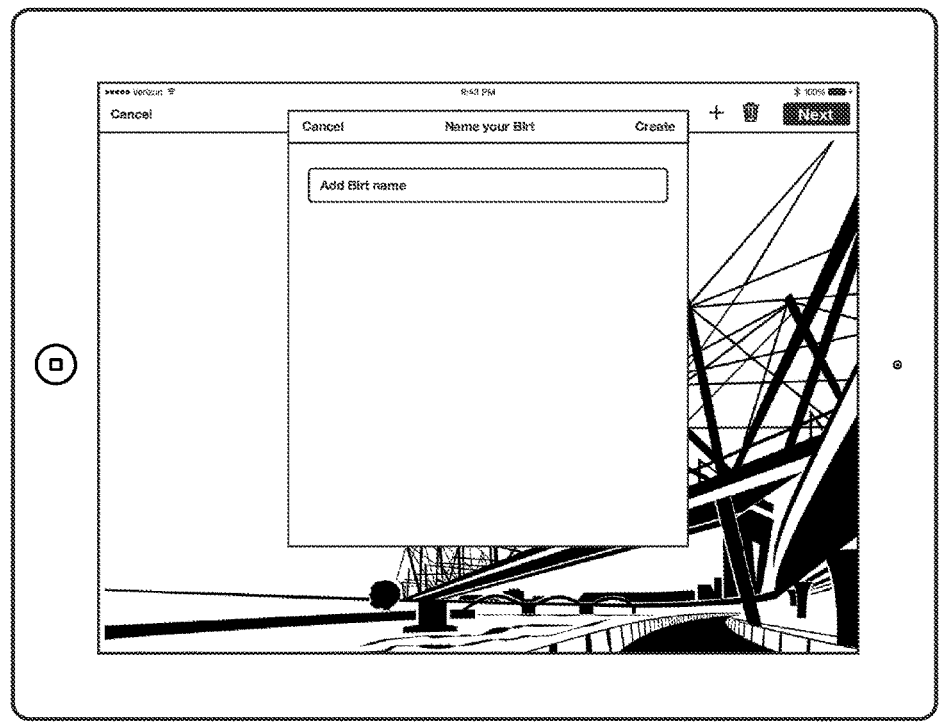

FIG. 15 depicts a screenshot in which the user is invited to 'Add Blrt name' in a window 'Name your Blrt'. This is essentially a subject heading for the Blrt message.

Figure 16:
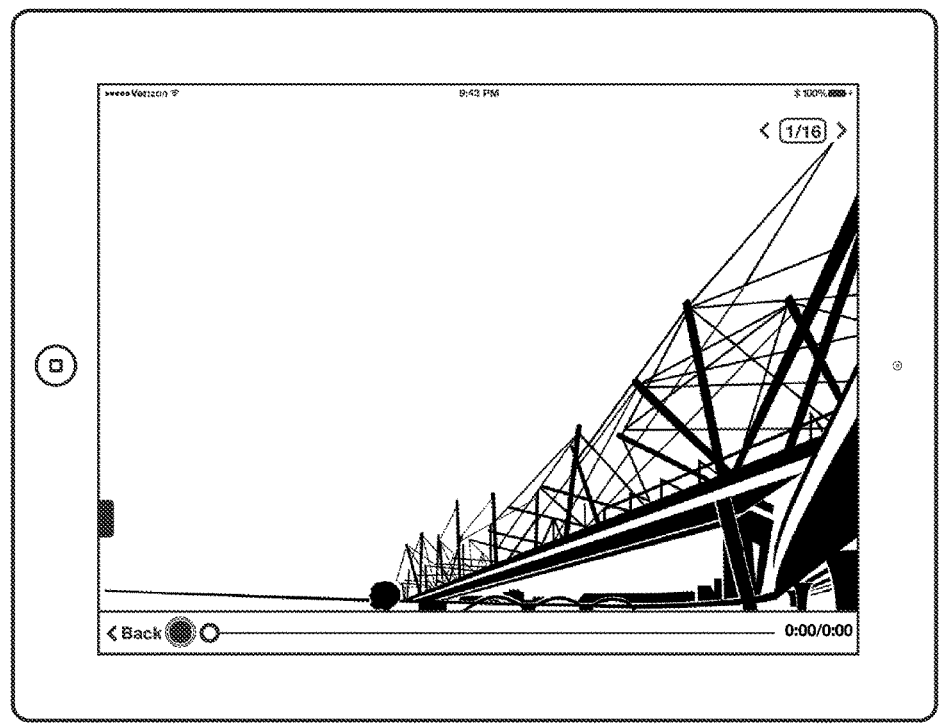

FIG. 16 depicts a screenshot in which the image is previewed, and a (red-coloured) dot is provided at the bottom left of the interface to invite the user to start recording the Blrt message, after having named the prospective Blrt.

Figure 17:
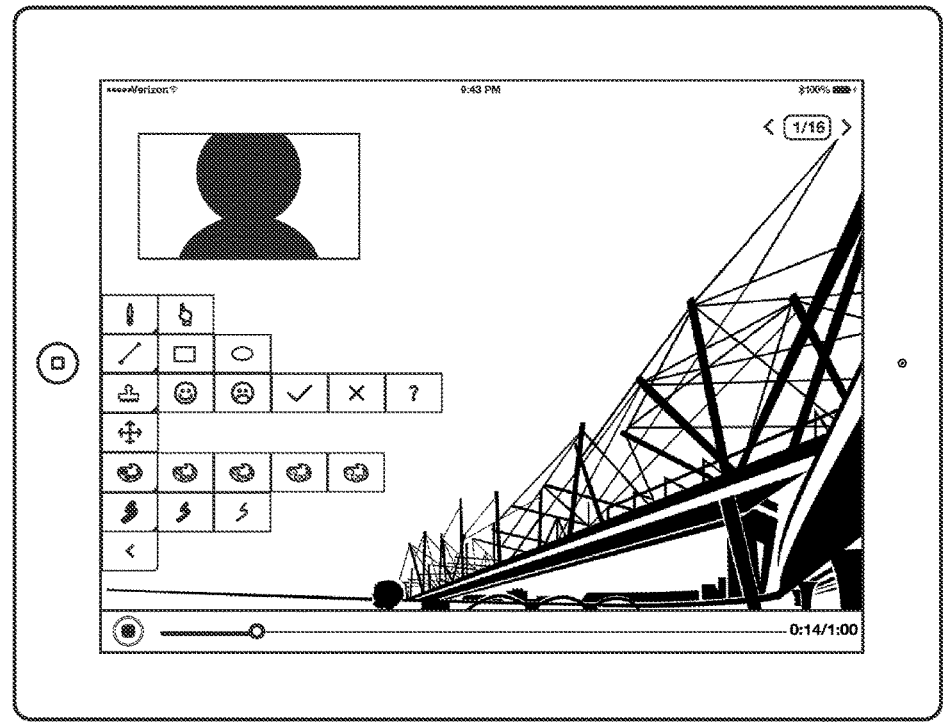

FIG. 17 in fact depicts a screenshot once this process is underway (by 0:14 s) using the image of a bridge earlier selected from the Camera Roll. Audio is recorded, and the Interface provides a tool palette that can be used as required by the user in tandem with the audio narration to convey the content desired by the user. The tool palette may comprise a selection of pens, shapes, icons, cursors and pointer of different thicknesses, colours, shapes and configurations as required. The image may be panned, zoomed and rotated as required using touch gestures to the screen of the iPad. Suitable tools and options may be selected and used by touch gesture. Other client devices lacking touch gesture input may use a mouse of other input means of constructing this accompanying gesture annotation.

Figure 18:
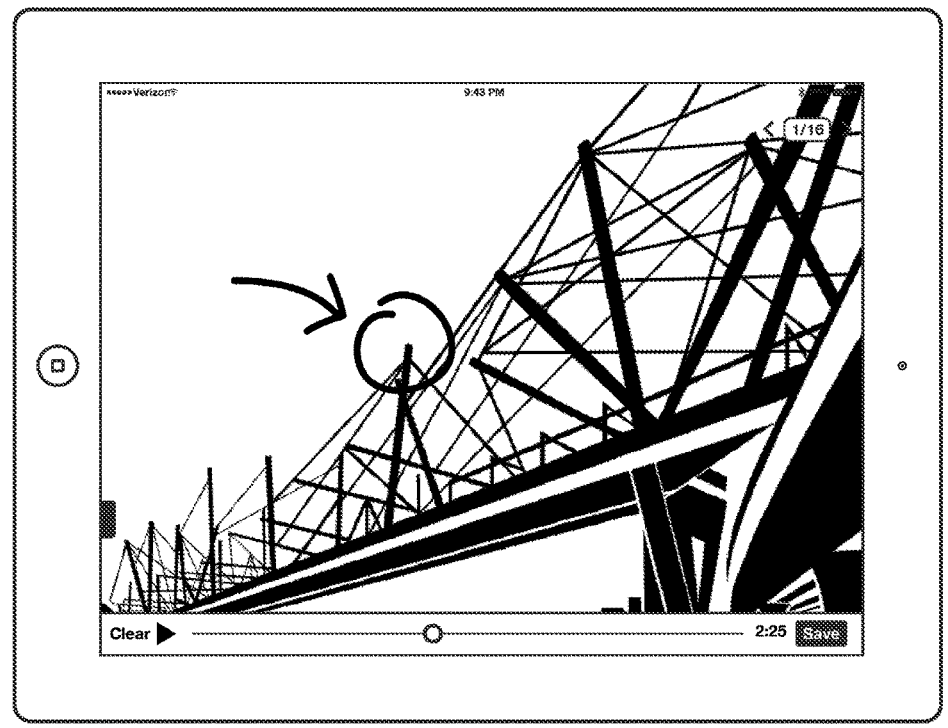

FIG. 18 depicts a screenshot of subsequent recording, in which the user has in this case zoomed the image to crop away some peripheral material to focus on a detail of the bridge. The user has in this Blrt drawn attention to a structural mast of the bridge, first by zooming, and second by circling this detail, and moreover using an accompanying arrow.

Website Example

Figure 19:
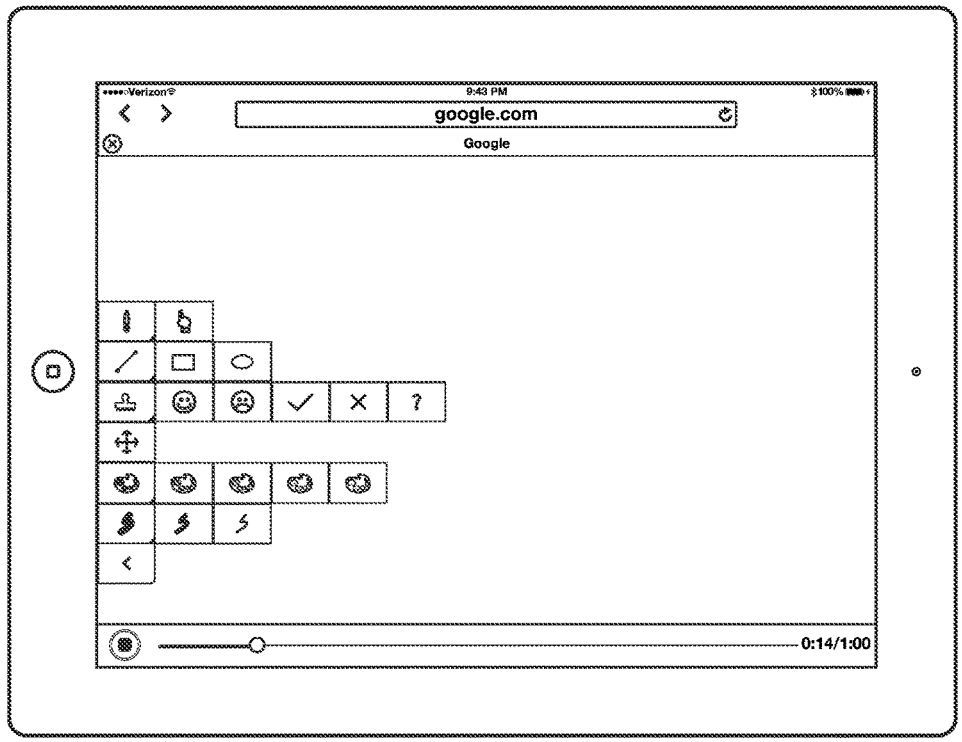
Figure 20:
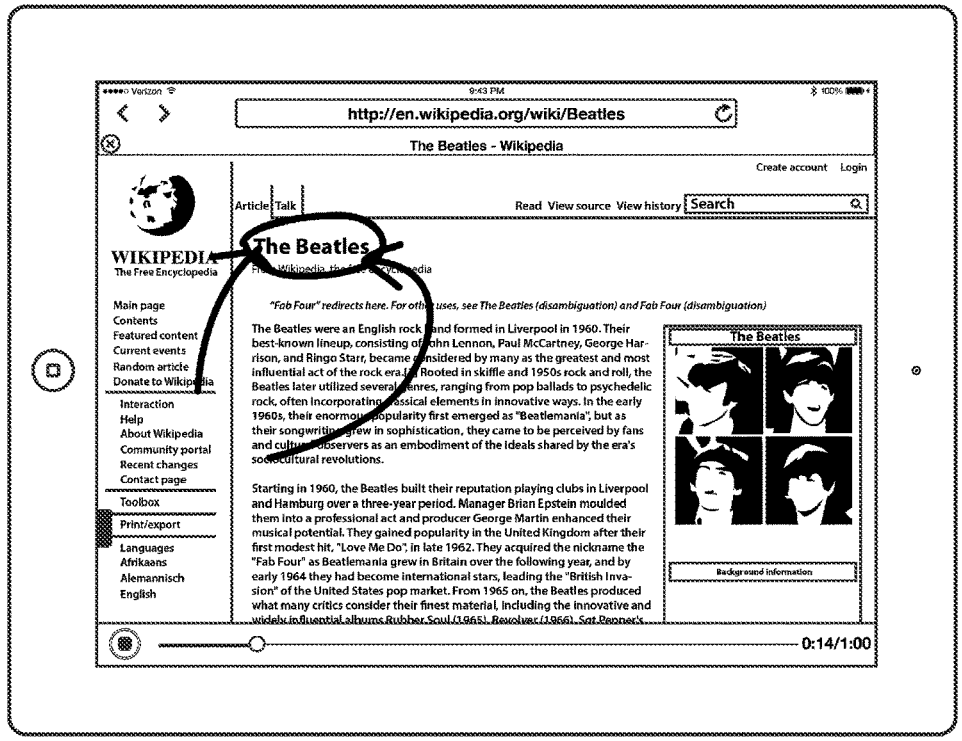
Figure 21:
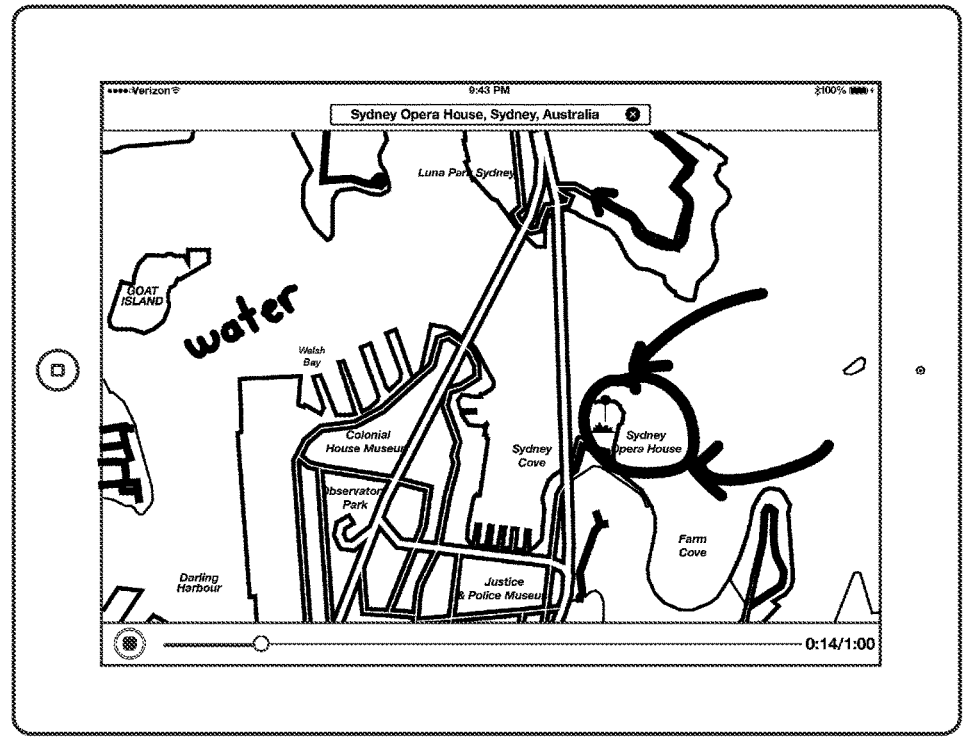

FIGS. 19 to 21 depict screenshots in which third party websites are used in constructing Blrt messages. FIG. 19 depicts a screenshot in which a URL address bar (by default populated by google.com) is presented for use by a user to input or search for a website the user wishes to feature in their Blrt.

FIG. 20 depicts a Wikipedia entry for 'The Beatles', with the user circling and annotating the title of the Wikipedia entry to accompany the audio narration of the Blrt.

FIG. 21 is a screenshot of a Blrt under construction, featuring a website which displays a map of Sydney Harbour. The user has drawn attention using pen tools to the Sydney Opera House, as well as a road to the north of the Sydney Opera House. For clarity, the user has scribbled 'water' on the harbour to make clear which is land and which is water in the map. The accompanying audio describes a proposed walk and subsequent destination to a group of recipients.

Addressing

FIGS. 22 to 27 depict various screenshots associated with aspects of addressing Blrts.

Figure 22:
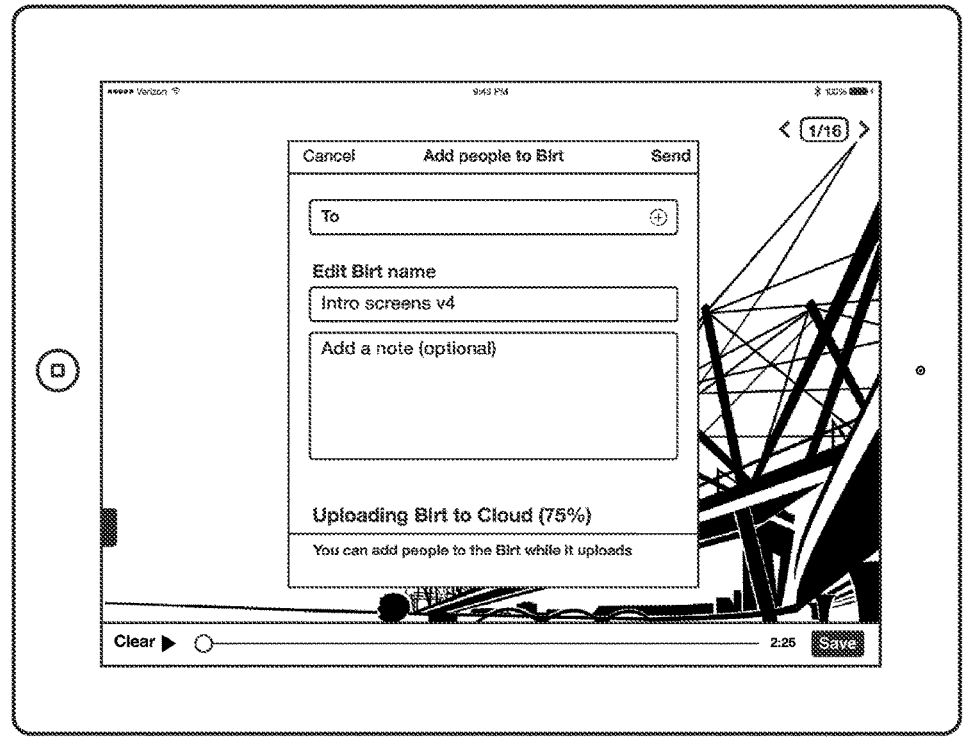

FIG. 22 returns to the Blrt created earlier (with reference to FIGS. 11 to 18), and at the conclusion of recording presents a window entitled 'Add people to Blrt' inviting the user to add users who are to receive the Blrt. The underlying image has uploaded during recording of the Blrt, and the audio data and gesture data are in the process of uploading as the user embarks of selecting recipients for the newly created Blrt.

Figure 23:
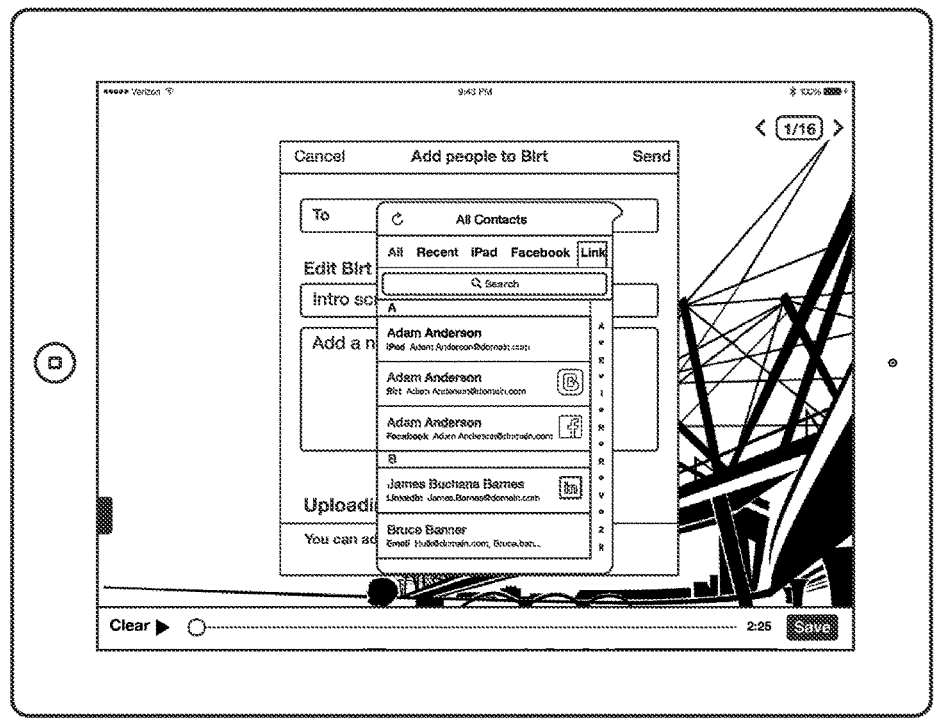

FIG. 23 depicts a screenshot in which the user selects on an interface element which permits access to the user's 'Contacts', and presents a scrolling list of contacts to select from, which can be filtered as: All, Recent, iPad, Facebook or Link.

Figure 24:
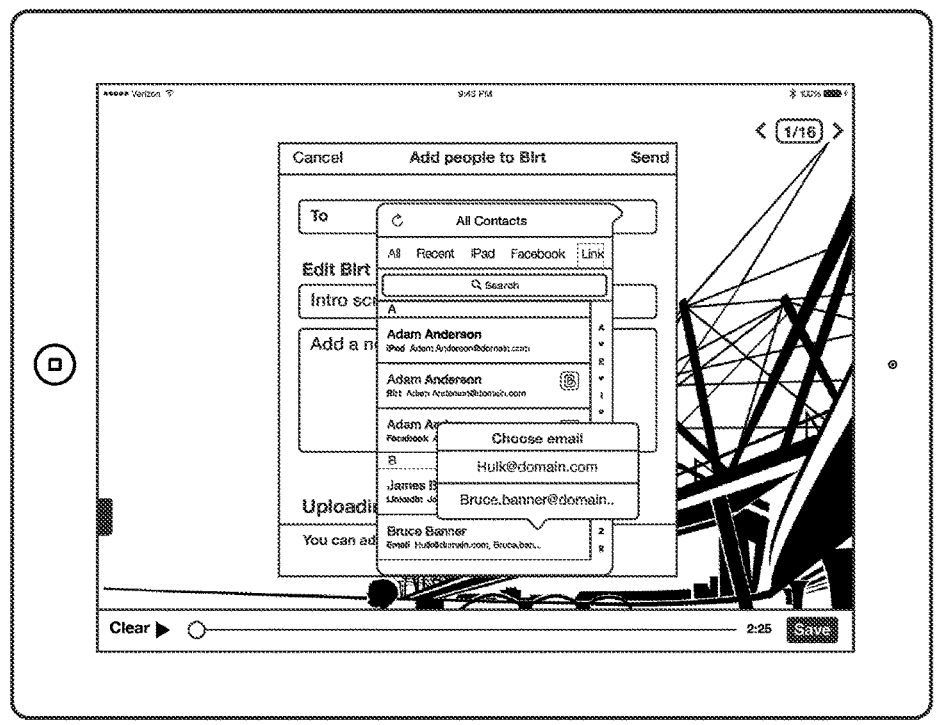
Figure 25:
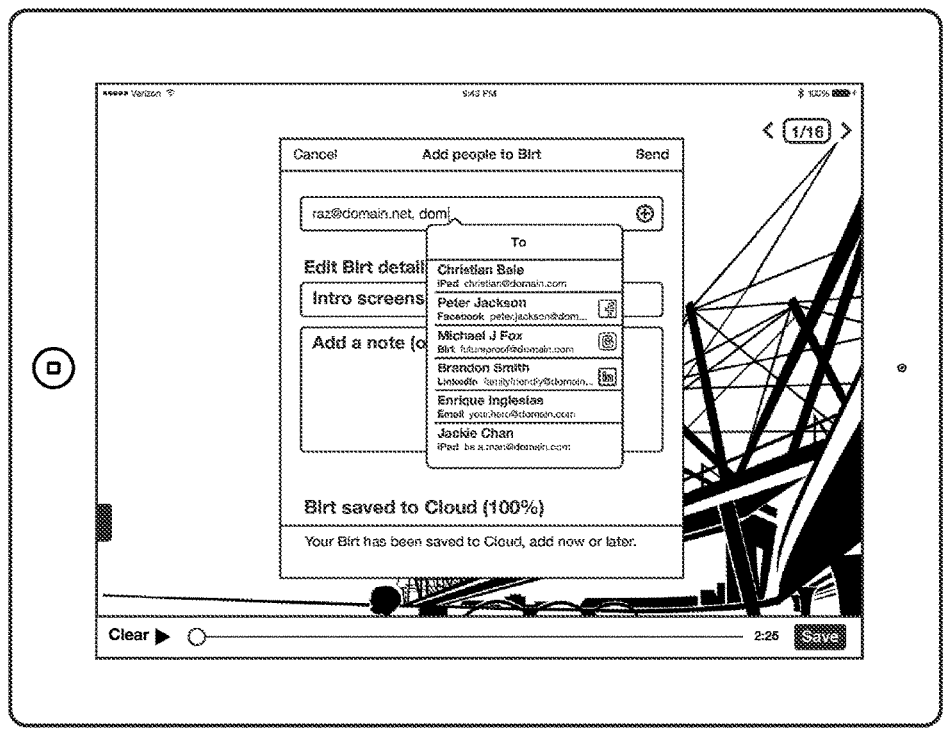
Figure 26:
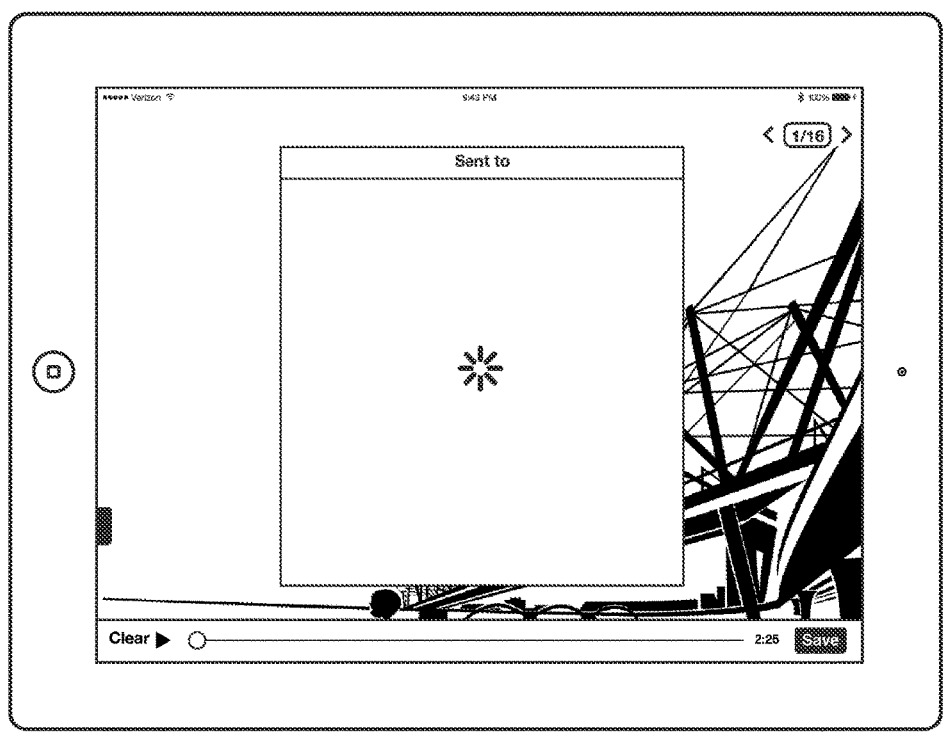
Figure 27:
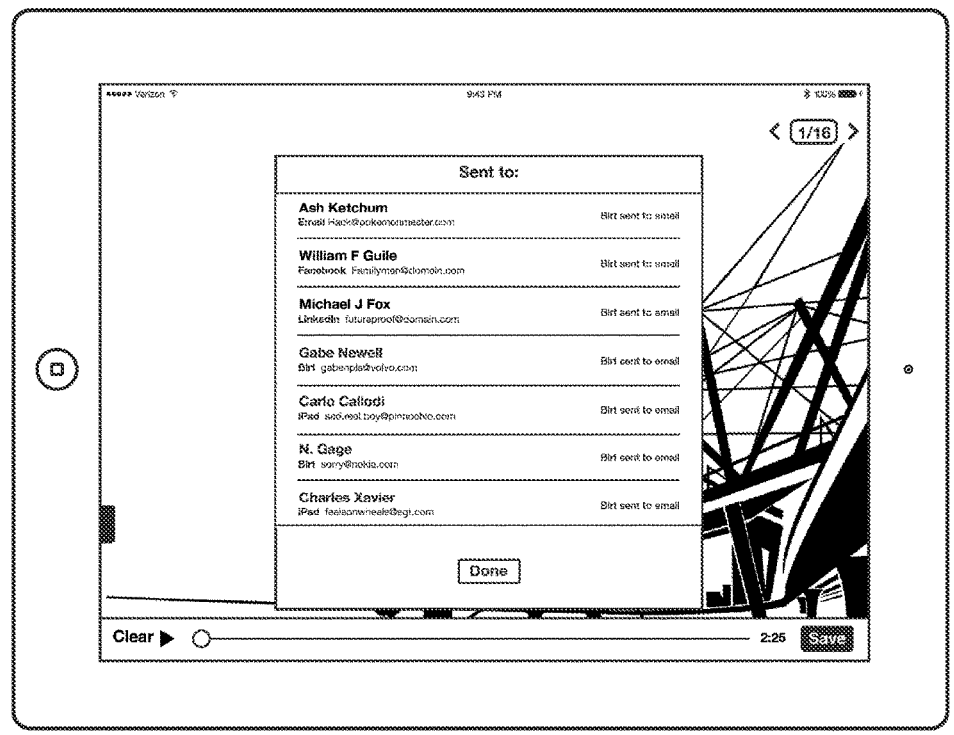

FIG. 24 depicts a screenshot in which the user has in this case selected to preview the nominated contact ('Bruce Banner') from his contact list. FIG. 25 depicts a further screenshot, in which a list of recipients is under preparation. FIG. 26 depicts the Blrt being sent, as indicated by a window entitled 'Sent to' and an accompanying 'hourglass'-style icon. FIG. 27 depicts a screenshot which features a confirmatory window featuring a list of the recipients of the Blrt.

Conversations

Figure 28:
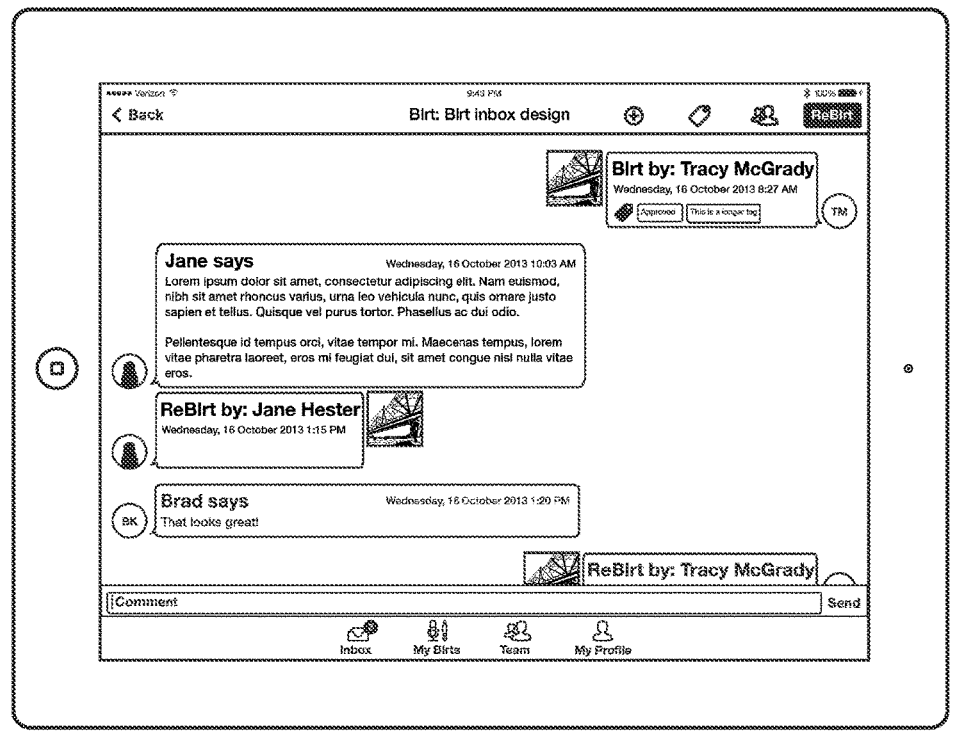
Figure 29:
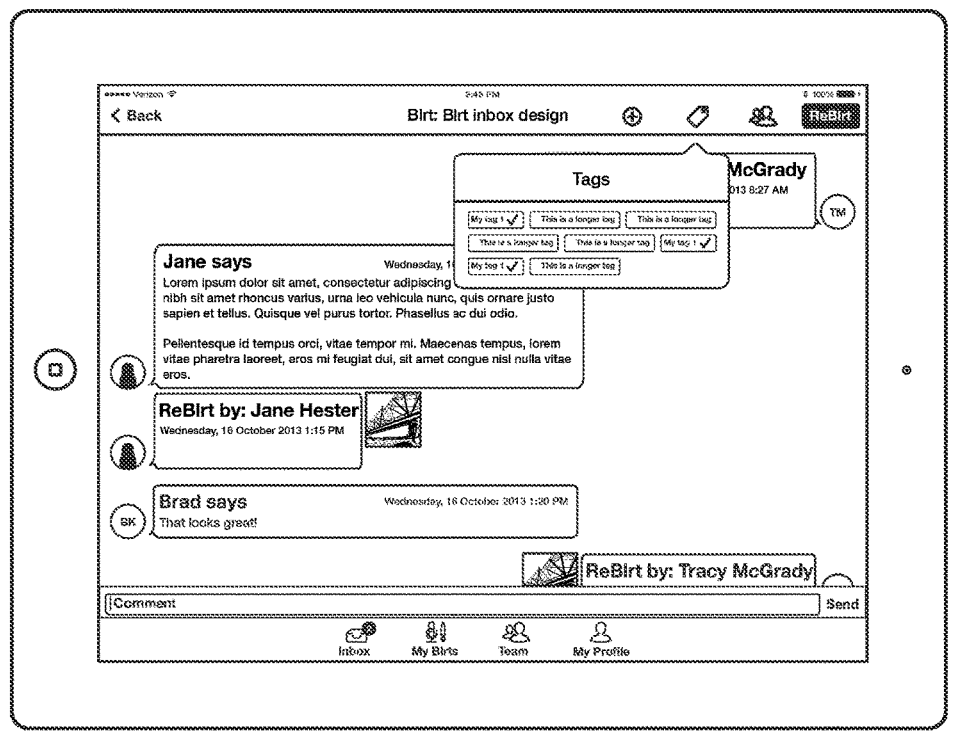

FIGS. 28 and 29 depict screenshots illustrating example conversations within the Blrt app. FIG. 28 depicts a screenshot featuring an originating Blrt is depicted from 'Tracy McGrady' at upper right, followed in reply down the canvas by a return comment from 'Jane Hester', and a subsequent Blrt Reply featuring the same image. 'Brad' has contributed a comment, and then Tracey McGrady has in turn replied with his own Blrt Reply in answer to Jane and Brad.

FIG. 29 depicts a further screenshot similar to that of FIG. 28, in which a user has selected an interface element to view and optionally add 'tags' associated with the conversational thread of FIG. 29. These are displayed in a window entitled 'Manage Tags'.

System Topology

Figure 30:
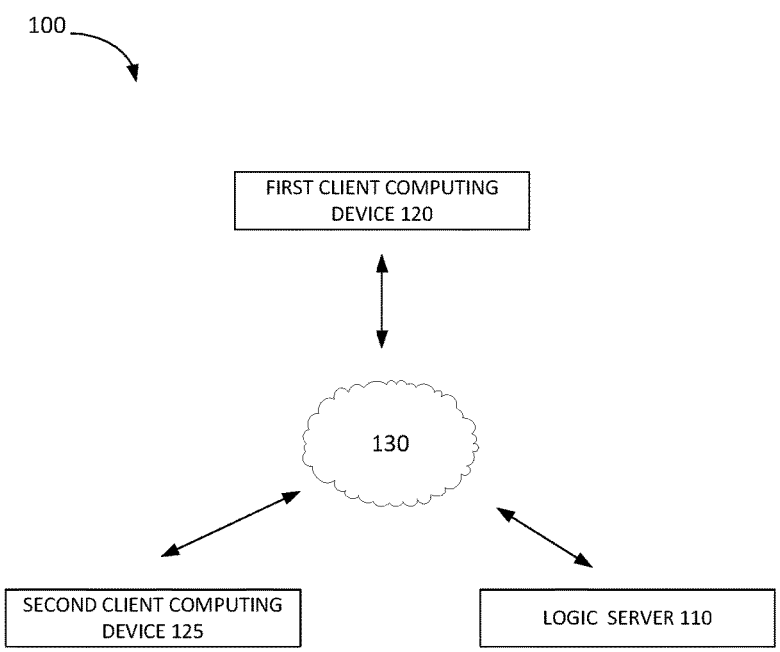
FIG. 30 depicts an example topology and allowing uses to communicate data.

FIG. 30 depicts one topology allowing users to communicate data, while reducing the bandwidth associated with transmitting the media. Topology 100 may include a logic server 110, first client computing device 120 and second client computing device 125. The elements depicted in topology 100 may be communicatively coupled to each other over network 130.

Network 130 may be a wired or wireless network such as the Internet, an intranet, a LAN, a WAN, a cellular network or another type of network. It will be understood that network 130 may be a combination of multiple different kinds of wired or wireless networks. Network 130 may also be comprised of telephone lines, fiber optic cables, internet cables, microwave transmission links, cellular networks, communications satellites, undersea telephone cables, which may be interconnected by switching centers.

First client computing device 120 may be a laptop computer, desktop computer, smart phone, tablet computer, personal data assistant, or any other type of device with a hardware processor that is configured to process instructions and connect to network 130 to communicate with logic server 110. First client computing device 120 may include a memory device, a graphical user interface, and a presentation device. The memory device may be a device that stores data generated or received by logic server 110, such as a data package corresponding to a presentation. The memory device may include, but is not limited to a hard disc drive, an optical disc drive, and/or a flash memory drive. In embodiments, the memory device may be configured to store information received from second client computing device 125 and/or logic server 110. The user interface may be a device that allows a user to interact with first client computing device 120, second client computing device 125, or logic server 110 over network 130. While one user interface is shown, the term "user interface" may include, but is not limited to being, a touch screen, a physical keyboard, a mouse, a camera, a microphone, and/or a speaker. The presentation device may be a hardware processor that may receive information configured to be displayed on the user interface of first client computing device 120. For example, the presentation device may receive a data package from logic server 110 and display the elements of the data package to the user of first client computing device 120. Utilizing the user interface, a user may perform actions to create a presentation including a data package, wherein the data package may include media data, gesture data, and/or audio data. For example, the user may obtain a picture to create media data, performs actions on a screen to record gesture data, and/or speak to create audio data. In embodiments, first client computing device 120 may be configured to generate a presentation which may be configured to be received and reproduced at second client computing device 125.

Second client computing device 125 may be a laptop computer, desktop computer, smart phone, tablet computer, personal data assistant, or any other type of device with a hardware processor that is configured to process instructions and connect to network 130 to communicate with logic server 110. Second client computing device 125 may include a memory device, a graphical user interface, and a presentation device. The memory device may be a device that stores data generated or received by logic server 110, such as a data package. The memory device may include, but is not limited to a hard disc drive, an optical disc drive, and/or a flash memory drive. In embodiments, memory device may be configured to store information received from first client computing device 120 and/or logic server 110. The user interface may be a device that allows a user to interact with first client computing device 120, second client computing device 125, or logic server 110 over network 130. While one user interface is shown, the term "user interface" may include, but is not limited to being, a touch screen, a physical keyboard, a mouse, a camera, a video camera, a microphone, and/or a speaker. The presentation device may be a hardware processor that may receive information configured to be displayed on the user interface of second client computing device 125. For example, the presentation device may receive a data package from logic server 110 and display the elements of the data package to the user of second client computing device 125. Utilizing the presentation device, second client computing device 125 may be configured to receive the data package to reconstruct the presentation locally at second client computing device 125.

Logic server 110 may be a computing device, such as a general hardware platform server configured to support mobile applications, software, and the like executed on first client computing device 120 and/or second client computing device 120. Logic server 110 may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Logic server 110 may include any combination of one or more computer-usable or computer-readable media. For example, Logic server 110 may include a computer-readable medium including one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device.

In embodiments, logic server 110 may be configured to receive data from first client computing device 120, determine what data is stored at second client computing device 125, and transmit data to second client computing device 125 that is not locally stored at second client computing device 125. Logic server 110 may be configured to receive a package of data from first client computing device 120, wherein the package of data may include data that is stored in various formats, such as audio data, gesture data, and media data. The formats of data within the package may have different memory sizes, which require varying amounts of bandwidth to transmit to different network elements over network 130. Therefore, logic server 110 may reduce the amount of bandwidth required to transmit the package of data over network 130, by only transmitting data requiring higher bandwidth (e.g. media data) to second client commuting device 125 once. For example, logic server 110 may be configured to determine if the media data received from first client computing device 120 is stored locally at second client computing device 125, and transmit the media data to second client computing device 125 if the media data is not stored locally at second client computing device 125.

Logic server 110 may also be configured to transmit audio data and/or gesture data as it is received from first client computing device 120 to second client computing device 125. Therefore, the audio data and/or gesture data may be transmitted to second client computing device 125 asynchronously. As a user at first client computing device 120 creates audio data and/or gesture data, the audio data and/or gesture data may be received by logic server 110, and relayed to second client computing device 125.

Figure 31:
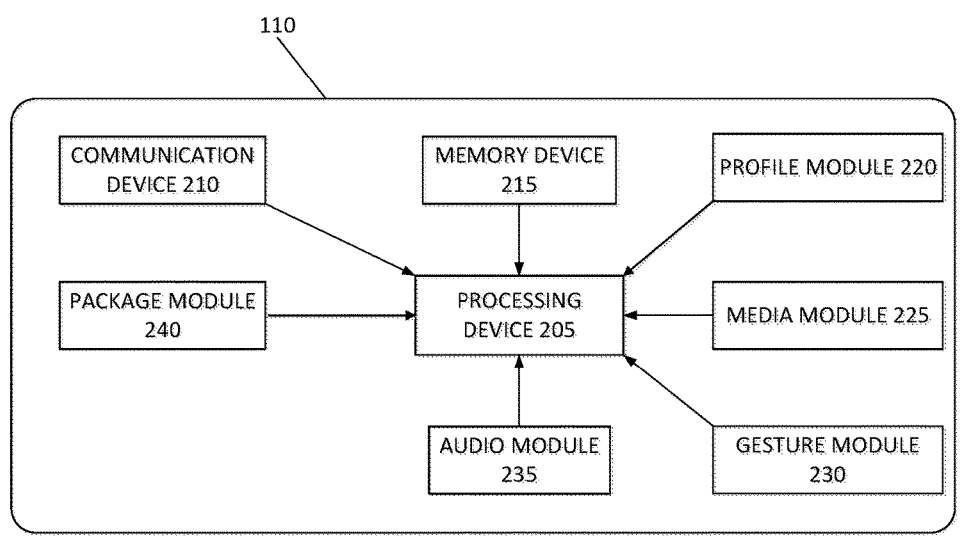
FIG. 31 depicts a structural diagram of an example of one embodiment of a logic server.

FIG. 31 depicts one embodiment of logic server 110. Logic server 110 may include a processing device 205, communication device 210, memory device 215, profile module 220, media module 225, gesture module 230, audio module 235, and package module 240.

Processing device 205 may include memory, e.g., read only memory (ROM) and random access memory (RAM), storing processor-executable instructions and one or more processors that execute the processor-executable instructions. In embodiments where processing device 205 includes two or more processors, the processors may operate in a parallel or distributed manner. Processing device 205 may execute an operating system of logic server 110 or software associated with other elements of gift card server 110.

Communication device 210 may be a device that allows logic server 110 to communicate with another device over network 130. Communication device 210 may include one or more wireless transceivers for performing wireless communication and/or one or more communication ports for performing wired communication over network 130. Communication device 210 may be configured to communicate data over a plurality of different standard and/or protocols.

Memory device 215 may be a device that stores data generated or received by logic server 110. Memory device 215 may include, but is not limited to a hard disc drive, an optical disc drive, and/or a flash memory drive. In embodiments, memory device 215 may be configured to store information received from first client computing device 120 and/or second client computing device 125. The information stored within memory device 215 may be accessed by processing device 205, communication device 210, and/or modules 220, 225, 230, 235, 240.

Profile module 220 may be a hardware processing device configured to allow the user of client computing devices 120,125 to generate and create a user profile. The user's profile may include information stored in memory device 215 and/or other storage locations. The user's profile may include user information, package information, and reply information. The user information may include for example, information identifying users (e.g., a username or handle, a number, an identifier, and/or other identifying information), security login information (e.g., a login code or password), payment information (e.g., credit card information), etc. The package information may include information corresponding to the data that is stored locally at a client computing device associated with the user, wherein the package information may be utilized to locally reconstruct a presentation. For example, the package information may include a identification, tag, etc. associated with a first piece of media that is stored locally at a first client computing device 120 associated with the user. Utilizing the package information, logic server 110 may be able to determine what media data, gesture data, and/or audio data is stored locally at client computing devices associated with the user. Reply information may include data corresponding to a reply from second client computing device 125 to first client computing device 120. The reply information may include an identification corresponding to a piece of media data, audio data, and/or gesture data within a reply package. The reply information may include the same media data, audio data, and/or gesture data corresponding to the transmission of data from first client computing device 120 to second client computing device 125. Utilizing the profile information and reply information, package module 240 may determine what data is not stored locally at the receiving client computing device 120, 125, and transmit the data that is not stored locally at the receiving client computing device 120, 125.

Media module 225 may be a hardware processing device configured to receive media data from first client computing device 120 and/or second client computing device 125. The received media data may correspond to a package of data to be presented to a user of first computing device 120 and/or second computing device 125, which may be the largest file type within the package of data. The media data may be formatted in a plurality different types, such as a pdfs, jpgs, bitmaps, image files, gifs, etc, namely images files regardless of whether or not they are predominantly raster-based or vector-based in nature, and regardless of their semantic content. In embodiments, the media data may be utilized as a fundamental data file of the package of data, wherein the gesture data may be overlaid on the media data and the audio data may be synced to the presentation of the media data to a user. The media data may be received by media module 225 before the gesture module 230 and/or audio module 235, and may be received responsive to a user initiating the creation of a presentation on first client computing device 120. Therefore, media module 225 may receive the media data before the presentation is completed.

Gesture module 230 may be a hardware processing device configured to receive gesture data from first client computing device 120 and/or second client computing device 125. The gesture data may be received responsive to a user performing actions or movements on a graphical user interface, which may correspond to the media data. The gesture data may be formatted in a plurality of different types and may be synched to the media data, wherein the gesture data may be overlaid on the media data at various times. For example, in one embodiment the gesture data may include a circle drawn by a user, which is overlaid on the media data at a specific time range. The gesture data may correspond to a single action performed by a user and/or a plurality of actions performed by the user. The gesture data may be a file size which is smaller than the file of the media data, and may be transmitted to logic server 110, first client computing device 120, and/or second client computing device 125 independent of the media data and/or audio data.

Audio module 235 may be a hardware processing device configured to receive audio data from first client computing device 120 and/or second client computing device 125. The audio data may be received responsive to a user performing to produce the audio, which may correspond to the media data. The audio data may be formatted in a plurality of different types and may be synched to the media data and gesture data, wherein segments of the audio data may correspond to actions associated with the gesture data and/or a time range while the media data is presented to a user. For example, in one embodiment the audio data may be a recording that should be presented for the first sixty seconds the media data is presented on first or second client computing device 120, 125. The audio data may correspond to an entire segment of time the media data is presented to the user and/or a plurality of segments of time while the media data is presented to the user. Furthermore, the audio data may be a file size which is smaller than the file of the media data, and may be transmitted to logic server 110, first client computing device 120, and/or second client computing device 125 independent of the media data and/or gesture data.

Package module 240 may be a hardware processing device configured to receive the media data, gesture data, and/or audio data from first client computing device 120 and transmit the media data, gesture data, and/or audio data to a second client computing device 125. Package module 240 may receive the media data from first client computing device 120 responsive to the user of first client computing device 120 creating a presentation. Responsive to package module 240 receiving the media data, package module 240 may be configured to determine a recipient user to receive the media data based on metadata associated with the media data, parse an entry within memory device 215 associated with the recipient user, and determine if the media data is locally stored at second client computing device 125 associated with the recipient user. If the media data is locally stored at second client computing device 125, package module 240 may not transmit the media data to second client computing device 125, and if the media data is not locally stored at second client computing device 125, package module 240 may transmit the media data to second client computing device 125. Package module 240 may then update the entry within memory device 215 associated with the recipient user to indicate that the media data is locally stored at second client computing device 125. Therefore, the media data may only be required to be transmitted to second client computing device 125 a single time, which may reduce bandwidth over network 130. Furthermore, responsive to receiving media data from first client computing device 120 to be transmitted to second client computing device 215, package module 240 may update an entry within memory device 215 associated with the user of first client computing device 120 to indicate that the media data is locally stored at first client computing device 120. Therefore, package module 240 may not be required to transmit the media data to first client computing device 120.

Package module 240 may also be configured to transmit audio data and/or gesture data to second client computing device 125 responsive to receiving the audio data and/or gesture data from first client computing device 120. In embodiments, package module 240 may automatically transmit the audio data and/or gesture data to second client computing device 125, wherein the audio data and/or gesture data are utilized to reproduce the original presentation on second client computing device 125 which was created on first client computing device 120. Therefore, package module 240 may be configured to transmit only a portion of a presentation created at first client computing device 120 to second client computing device 120, and the transmitted portion may be based on the type of data generated by an end user (e.g. media data, audio data, gesture data, etc.).

Figure 32:
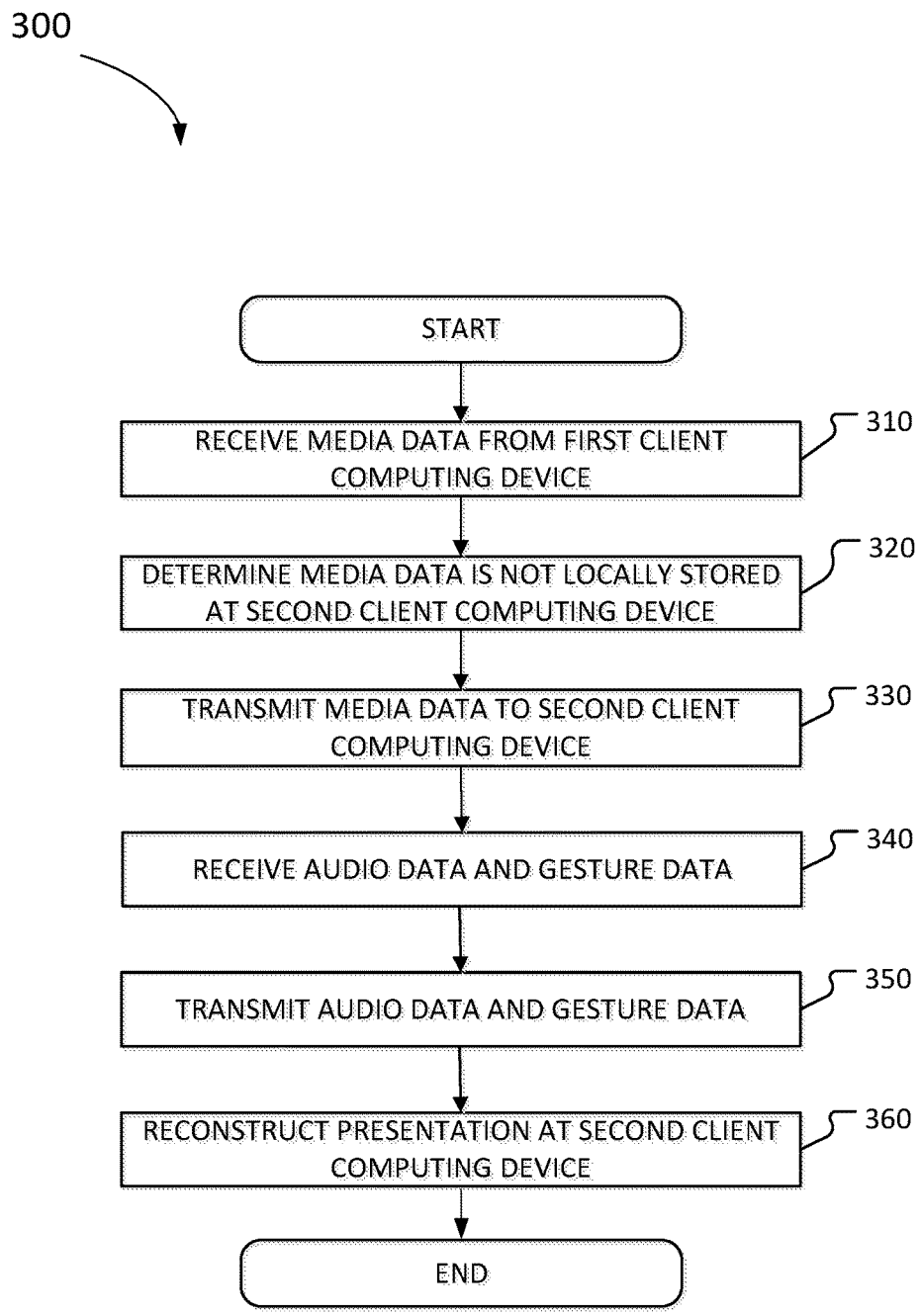
FIG. 32 is a flowchart illustrating a method for transmitting presentations.

FIG. 32 illustrates a method 300 for transmitting presentations created at a first client computing device to a second client computing device, while reducing the bandwidth required to transmit the presentation. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 32 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 310, media data associated with a presentation may be received from a first client computing device. The media data may be received before the presentation is completed at the first client computing device, and may be received responsive to the creation of the presentation being initiated. The media data may include metadata indicating a recipient user operating a second client computing device that should receive the presentation. The media data may be the largest file associated with the presentation that is required to be transmitted from the first client computing device to the second client computing device. Operation 310 may be performed by a media module that is the same as or similar to media module 225, in accordance with one or more implementations.

At operation 320, before the presentation is completed, it may be determined that the media is not locally stored at the second client computing device. The determination may be made responsive to parsing an entry of a memory device associated with the recipient user operating the second client computing device to determine that the second client computing device has not received a presentation including the media data and/or the second client computing device has not transmitted a presentation include the media data. Operation 320 may be performed by a package module that is the same as or similar to package module 235, in accordance with one or more implementations.

At operation 330, responsive to determining that the media data is not locally stored at the second client computing device, the media data may be transmitted to the second client computing device, wherein the media data may be transmitted to the second client computing device before the presentation is complete and/or before the other portions of the presentation (e.g. audio data and/or presentation data) have been received by the logic server. Operation 330 may be performed by a package module that is the same as or similar to package module 235, in accordance with one or more implementations.

At operation 340, other portions of the presentation, such as audio data and/or gesture data, may be received from the first client computing device. The audio data and/or gesture data may be received independently and/or at different time periods, which may be after the media data is transmitted to the second client computing device. The audio data and/or gesture data may be received during the creation of a presentation in segments and/or after a presentation is completed. Operation 340 may be performed by a gesture module and/or an audio module that are the same as or similar to gesture module 230 and/or audio module 235, in accordance with one or more implementations.

At operation 350, the audio data and/or gesture data may be transmitted automatically to the second client computing device responsive to receiving the audio data and/or gesture data. Operation 350 may be performed by a package module that is the same as or similar to package module 235, in accordance with one or more implementations.

At operation 360, the presentation may be reconstructed at the second client computing device, utilizing the different portions of the presentation, such as the media data, gesture data, and/or audio data. Operation 360 may be performed by a second client computing device that is the same as or similar to second client computing device 125, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The invention claimed is:

1. A computer-implemented method of hosting an asynchronous messaging service on a server for use by users via client devices in communication with the server, the client devices executing an application for originating and sharing, asynchronously amongst users, messages comprising image data, audio data, and gesture data, the server comprising hardware components adapted for performing steps of:
   receiving at the server from an originating client device, a first transmission comprising recorded audio data and gesture data relating to a message;
   storing the first transmission comprising the audio data and the gesture data at the server in association with a second transmission comprising the image data to which the first transmission relates; and
   distributing the stored first transmission comprising the audio data and the gesture data to a recipient client device from the server separate from the image data; wherein the received first transmission comprising the audio data and the gesture data is recorded at the originating client device in association with the second transmission comprising the image data, and distributed to the recipient client device for reproduction by the recipient client device in association with the second transmission, the reproduction comprising presenting the audio data and gesture data in association and coordination with the image data thereby reproducing at the recipient client device the recorded audio data and gesture data in context with the image data as it was recorded at the originating client device thereby presenting a reduced bandwidth video-like experience for the recipient.

2. A method according to claim 1, further comprising receiving the second transmission from an originating client device at the server, and distributing the second transmission to a recipient client device.

3. A method according to claim 1, wherein the second transmission is received at the same time as or before the first transmission is recorded.

4. A method according to claim 1, further comprising receiving the second transmission from a client device at the server.

5. A method according to claim 1, wherein gesture data comprises panning, zooming and rotating of the image data.

6. A method according to claim 1, wherein gesture data comprises visual annotations layered on the image data.

7. A server for hosting a messaging service for use by users via client devices in communication with the server, the client devices executing an application for originating and sharing amongst users messages comprising image data, audio data, and gesture data, the server comprising hardware components adapted for performing steps according to claim 1.

8. A computer-implemented method of using a client device for interacting with a messaging service hosted on a server via an application executing on the client device for originating and sharing amongst users messages comprising image data, audio data, and gesture data, the application adapted for performing steps of:
   uploading, to the server using the client device, a second transmission comprising image data;
   recording, using the client device, a first transmission comprising audio data and gesture data which relate to the second transmission; and uploading the first transmission from the client device to the server separate from the image data for storage in association with the second transmission to which the first transmission relates to facilitate reproduction;
   the reproduction comprising presenting the audio data and gesture data in association and coordination with the image data thereby reproducing at the recipient client device the recorded audio data and gesture data in context with the image data as it was recorded at the originating client device thereby presenting a reduced bandwidth video-like experience for the recipient.

9. A method according to claim 8, wherein the second transmission is uploaded before or as the first transmission is recorded.

10. A client device for interacting with a messaging service hosted on a server via an application executing on the client device for originating and sharing amongst users messages comprising image data, audio data, and gesture data, the application adapted for performing steps according to claim 8.

11. An application configured to execute on a client device and according to claim 8.

* * * * *